US009028790B2

United States Patent
Sato et al.

(10) Patent No.: US 9,028,790 B2
(45) Date of Patent: *May 12, 2015

(54) CARBON NANOTUBE ASSEMBLY AND ELECTRICALLY CONDUCTIVE FILM

(75) Inventors: Kenichi Sato, Nagoya (JP); Masahito Yoshikawa, Nagoya (JP); Shuko Ikeuchi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 1348 days.

This patent is subject to a terminal disclaimer.

(21) Appl. No.: 12/449,646

(22) PCT Filed: Feb. 19, 2008

(86) PCT No.: PCT/JP2008/052697
§ 371 (c)(1),
(2), (4) Date: Oct. 30, 2009

(87) PCT Pub. No.: WO2008/102746
PCT Pub. Date: Aug. 28, 2008

(65) Prior Publication Data
US 2011/0127472 A1  Jun. 2, 2011

(30) Foreign Application Priority Data

Feb. 20, 2007 (JP) ................. 2007-040103
Jun. 29, 2007 (JP) ................. 2007-173564

(51) Int. Cl.
*D01F 9/12* (2006.01)
*B01J 19/08* (2006.01)
(Continued)

(52) U.S. Cl.
CPC ............... *C09D 5/24* (2013.01); *C01B 2202/20* (2013.01); *C01B 2202/30* (2013.01); *B82Y 30/00* (2013.01); *B82Y 40/00* (2013.01); *C01B 31/0233* (2013.01); *C01B 31/026* (2013.01);
(Continued)

(58) Field of Classification Search
USPC ........ 423/447.1, 447.2, 445 B; 977/734, 742, 977/750
See application file for complete search history.

(56) References Cited

U.S. PATENT DOCUMENTS 8,834,826 B2 * 9/2014 Sato et al. .................. 423/447.2
2004/0234445 A1 11/2004 Serp et al. .................. 423/447.3
(Continued)

FOREIGN PATENT DOCUMENTS

JP 2005-239531 A 9/2005
JP 2005-281672 A 10/2005
(Continued)

OTHER PUBLICATIONS

Translation of JP 2005-320579 A, Sakai Toyoaki et al., Nov. 17, 2005.*
(Continued)

*Primary Examiner* — Guinever Gregorio
(74) *Attorney, Agent, or Firm* — Kubovcik & Kubovcik

(57) ABSTRACT

Provided is an aggregate of carbon nanotubes wherein a mixture of 10 mg of aggregate of carbon nanotubes, 30 mg of sodium polystyrene sulfonate and 10 mL of water is subjected to ultrasonic homogenizer treatment, subsequently subjected to centrifugal treatment at 20000 G, then 9 mL of supernatant is sampled, and the content of aggregate of carbon nanotubes in the supernatant is 0.6 mg/mL or more. The aggregate of carbon nanotubes of the present invention can provide a dispersion of an aggregate of carbon nanotubes having a high concentration through very good dispersibility.

18 Claims, 14 Drawing Sheets

(51) Int. Cl.

| | |
|---|---|
| C01B 31/04 | (2006.01) |
| H01B 1/00 | (2006.01) |
| H01B 1/04 | (2006.01) |
| H01B 1/06 | (2006.01) |
| C09D 5/24 | (2006.01) |
| B82Y 30/00 | (2011.01) |
| B82Y 40/00 | (2011.01) |
| C01B 31/02 | (2006.01) |
| C09C 1/44 | (2006.01) |
| C09D 7/12 | (2006.01) |
| H01B 1/24 | (2006.01) |
| C08K 3/04 | (2006.01) |

(52) U.S. Cl.
CPC ........ *C01B 31/0273* (2013.01); *C01B 2202/02* (2013.01); *C01B 2202/04* (2013.01); *C01B 2202/06* (2013.01); *C01B 2202/28* (2013.01); *C01P 2002/82* (2013.01); *C01P 2004/04* (2013.01); *C01P 2004/13* (2013.01); *C01P 2004/133* (2013.01); *C08K 3/04* (2013.01); *C09C 1/44* (2013.01); *C09D 7/1291* (2013.01); *H01B 1/24* (2013.01)

(56) References Cited

U.S. PATENT DOCUMENTS

| | | | |
|---|---|---|---|
| 2006/0057290 A1 | 3/2006 | Glatkowski | 427/256 |
| 2006/0229403 A1 | 10/2006 | Takahashi et al. | 524/495 |
| 2006/0263588 A1 | 11/2006 | Handa et al. | 428/292.1 |
| 2009/0001326 A1 | 1/2009 | Sato et al. | 252/511 |
| 2009/0022652 A1 | 1/2009 | Sato et al. | 423/447.2 |
| 2009/0032777 A1 | 2/2009 | Kitano et al. | 252/510 |
| 2010/0193323 A1* | 8/2010 | Rogers et al. | 198/347.1 |
| 2012/0058889 A1* | 3/2012 | Nishino et al. | 502/328 |
| 2012/0103809 A1* | 5/2012 | Ihara et al. | 204/450 |

FOREIGN PATENT DOCUMENTS

| | | |
|---|---|---|
| JP | 2005-320579 A | 11/2005 |
| JP | 2005-343726 A | 12/2005 |
| JP | 2006-143532 A | 6/2006 |
| KR | 2007-0013755 A | 1/2007 |
| WO | 2004-069736 A2 | 8/2004 |
| WO | 2005/113432 A1 | 12/2005 |
| WO | 2006-132254 A1 | 12/2006 |
| WO | 2007/074629 A1 | 7/2007 |

OTHER PUBLICATIONS

Pumera; Electrochemical Properties of Double Wall Carbon Nanotube Electrodes; Nanoscale Res. Lett.; 2.87-93; 2007.*
Jorio et al.; Raman Spectroscopy of Carbon Nanotubes; Physics Reports; vol. 409, Issue 2, pp. 47-99; 2005.*
M. Endo, et al, "Buckypaper from coaxial nanotubes", Nature vol. 433, p. 476, 2005.
H. Muramatsu, et al. "Pore structure and oxidation stability of double-walled carbon nanotube-derived bucky paper", Chemical Physics Letters, 414, pp. 444-448, 2005.
J. Miyamoto, et al. "Efficient $H_2$ Adsorption by Nanopores of High-Purity Double-Walled Carbon Nanotubes", J. Am. Chem. Soc. 128, pp. 12636-12637, 2006.
Office Action dated Jan. 20, 2009, in Japanese patent application S.N. 2008-039146 and English translation thereof.
Supplementary Partial European Search Report dated Feb. 14, 2011, issued in European patent application No. 08711521.8-1217/2117012 (PCT/JP2008/052697).

* cited by examiner

CARBON NANOTUBE ASSEMBLY AND ELECTRICALLY CONDUCTIVE FILM

This application is a 371 of international application PCT/JP2008/052697, filed Feb. 19, 2008, which claims priority based on Japanese patent application Nos. 2007-040103 and 2007-173564 filed Feb. 20, 2007, and Jun. 29, 2007, respectively, and which are incorporated herein by reference.

BACKGROUND OF THE INVENTION

The present invention relates to an aggregate of carbon nanotubes and a method for producing the same. Further, it relates to a dispersion, a transparent conductive film and a field emission material using the aggregate of carbon nanotubes.

BACKGROUND ART

In 1991, carbon nanotubes were widely reported for the first time. A carbon nanotube has a tubular shape that substantially one face of graphite is wound, one wound in one layer is called a single-walled carbon nanotube, and one wound in multilayer is called a multi-walled carbon nanotube. Among multi-walled carbon nanotubes, in particular, one wound in two layers is called a double-walled carbon nanotube. Carbon nanotubes are expected to be used as a conductive material having excellent intrinsic electrical conductivity by themselves.

As a method for producing carbon nanotubes, an arc layer, a catalyst chemical vapor deposition method has been known. Regarding the catalyst chemical vapor deposition method, a method conducted by supporting a catalyst on a support has been known.

Generally as carbon nanotubes, it is known that a single-walled carbon nanotube with a few number of layers or a double-walled carbon nanotube is excellent in characteristics such as electrical conductivity and heat conductivity because it has a high graphite structure. However, since these carbon nanotubes have a strong and very thick bundle structure, they cannot exhibit a nano-effect that each of the carbon nanotubes possesses, and it has been difficult to develop various applications thereof. In particular, since the dispersion in a resin or solvent is very difficult, the present situation is that the development of various applications has been hindered. In particular, it has been difficult to exhibit practical performance in applications as a transparent conductive film, molded article, membrane or the like using the carbon nanotubes.

Of multi-walled carbon nanotubes, carbon nanotubes with relatively a few number of layers, 2 to 5 layers, have both characteristics of single-walled carbon nanotubes and multi-walled carbon nanotubes, thus there have been drawn attentions as a promising material in various applications. Above all, it is thought that a double-walled carbon nanotube has the most excellent characteristic, and several synthesis methods have been known. Recently, as a synthesis method of double-walled carbon nanotubes with high purity, a method of Endo et al. is known (Non-patent documents 2, 3, 4, Patent document 1). In this method, a carbon source is reacted by disposing an iron salt as a main catalyst and molybdate as a co-catalyst to synthesize carbon nanotubes. The double-walled carbon nanotube obtained by this method has a high heat stability shown by a combustion peak temperature of 717° C., and it is considered as a double-walled carbon nanotube of relatively high quality. As the applications, an application as a field emitter used at a high electric current is described. However, such double-walled carbon nanotube forms, in the same manner as a single-walled carbon nanotube, a strong bundle through a hydrophobic interaction between tubes and interaction between π-electrons having difficulty in highly dispersing the carbon nanotube, thus it has been difficult to produce a transparent conductive film excellent in conductivity and transparency.

Patent document 1: Japanese Unexamined Patent Publication No. 2005-343726

Non-patent document 2: Nature, vol. 433, 476 (2005)

Non-patent document 3: Chemical Physics Letters, 414 (2005) 444-448

Non-patent document 4: Journal of American Chemical Society, 128 (2006) 12636-12637

DISCLOSURE OF THE INVENTION

Problems to be Solved by the Invention

The present invention has been done in the view of situations described above, and it is an object to obtain an aggregate of carbon nanotubes capable of providing a dispersion of an aggregate of carbon nanotubes having a high concentration through very good dispersibility.

Means to Solve the Problems

Namely, the present invention is composed of the followings.

1. An aggregate of carbon nanotubes, when a mixture of 10 mg of the aggregate of carbon nanotubes, 30 mg of sodium polystyrene sulfonate and 10 mL of water is subjected to ultrasonic homogenizer treatment, subsequently subjected to centrifugal treatment at 20000 G, and then 9 mL of supernatant is sampled, the content of the aggregate of carbon nanotubes in the supernatant is 0.6 mg/mL or more.

2. A dispersion wherein the aggregate of carbon nanotubes of 1. is dispersed in a dispersant.

3. A dispersion wherein an aggregate of carbon nanotubes satisfying the following conditions is dispersed in a dispersant:

(1) at least 50 of arbitrary 100 carbon nanotubes are double-walled carbon nanotubes when observed by a transmission electron microscope;

(2) peaks are observed at $140\pm10$ cm$^{-1}$, $160\pm10$ cm$^{-1}$, $180\pm10$ cm$^{-1}$, $270\pm10$ cm$^{-1}$, and $320\pm10$ cm$^{-1}$ by Raman spectroscopic analysis of wavelength 532 nm;

(3) a peak is observed at $220\pm10$ cm$^{-1}$ by Raman spectroscopic analysis of wavelength 633 nm; and (4) no peak is observed in a region from more than 190 cm$^{-1}$ to less than 260 cm$^{-1}$ by Raman spectroscopic analysis of wavelength 532 nm.

4. A conductive film wherein an aggregate of carbon nanotubes is coated on a substrate, and the light transmittance is 85% or more and the surface resistance is less than $1\times10^5\Omega/\square$.

5. A method for producing the aggregate of carbon nanotubes, wherein a powdery catalyst supporting iron on magnesia is disposed in a vertical reactor over the whole area in a horizontal cross section direction of the reactor, methane is flowed in a vertical direction inside the vertical reactor, methane and said catalyst are contacted at 500 to 1200° C. to synthesize an aggregate of carbon nanotubes, thereafter, oxidation treatment is conducted.

6. A field emission material using the aggregate of carbon nanotubes.

Effect of the Invention

According to the aggregate of carbon nanotubes of the present invention, it is possible to obtain a dispersion of an aggregate of carbon nanotubes having a high concentration through very good dispersibility. Further, by using a dispersion including the aggregate of carbon nanotubes of the present invention, it becomes possible to obtain a transparent conductive film extremely excellent in transparency and electrical conductivity. Particularly in the case of using an aggregate of carbon nanotubes including a double-walled carbon nanotube as an aggregate of carbon nanotubes, there are obtained a transparent conductive film of further high conductivity and excellent transmittance, and a field emission material with excellent electron discharge characteristics.

DESCRIPTION OF NUMBER AND SYMBOL

Figures 1A, 1B, 1C:
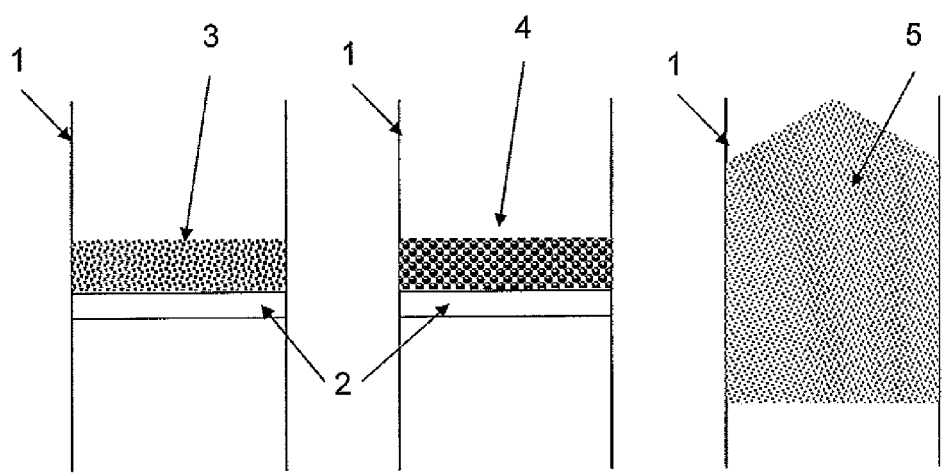
FIG. 1 shows a state that catalysts are present uniformly on a cross section of a reaction tube.

1 Reactor
2 Table to place catalyst
3 Catalyst
4 Mixture of catalyst and a substance other than catalyst
5 Catalyst
100 Reactor
101 Quartz sintered plate
102 Sealed feeder of catalyst
103 Catalyst input line
104 Raw gas supply line
105 Waste gas line
106 Heater
107 Inspection port
108 Catalyst

BEST MODE FOR CARRYING OUT THE INVENTION

The aggregate of carbon nanotubes of the present invention has very good dispersivility compared with conventional aggregates of carbon nanotubes, but since it is difficult to suitably identify an aggregate of carbon nanotubes satisfying such dispersibility by other methods, the identification is done by dispersibility when it is dispersed in a specific condition.

Namely in the present invention, an index for good dispersibility of an aggregate of carbon nanotubes is as follows: a mixture of 10 mg of aggregate of carbon nanotubes, 30 mg of sodium polystyrene sulfonate and 10 mL of water is subjected to ultrasonic homogenizer treatment, subsequently subjected to centrifugal treatment at 20000 G, then 9 mL of supernatant is sampled, and the content of aggregate of carbon nanotubes in the supernatant is 0.6 mg/mL or more.

Sodium polystyrene sulfonate acts as a dispersant of aggregate of carbon nanotubes. In the case of using a sodium polystyrene sulfonate aqueous solution, taking the concentration into account, it is added for sodium polystyrene sulfonate to be 30 mg as solid weight, and it is possible to prepare a dispersion liquid for the total to be 10 mL as water. As sodium polystyrene sulfonate used in this measurement, one with an average molecular weight of 200000±20000 of commercial products can be preferably used. Such sodium polystyrene sulfonate can be purchased, for example, from Sigma-Aldrich Corporation.

Ultrasonic homogenizer treatment denotes that a mixture of 10 mg of aggregate of carbon nanotubes, 30 mg of sodium polystyrene sulfonate and 10 mL of water is subjected to dispersion treatment under ice cooling for 20 minutes using an ultrasonic homogenizer at an output power of 25 W. As the ultrasonic homogenizer, a commercially available ultrasonic homogenizer (for example, UH-600S manufactured by SMT Corporation) can be used. Centrifugal treatment denotes a centrifugal separation operation at 20000 G for 15 minutes by a centrifugal separator. As the centrifugal separator, a commercially available centrifugal separator (for example, MX-300 manufactured by TOMY Co., Ltd.) can be used.

Additionally, sampling of supernatant is to be conducted in 30 minutes after a centrifugal separation operation. Since the aggregate of carbon nanotubes of the present invention is good in dispersibility, after the above-described operation, when 9 mL of supernatant is sampled, it is possible to achieve 0.6 mg/mL or more of the content of aggregate of carbon nanotubes in the supernatant, in preferable modes, to achieve 0.6 mg/mL to 1.0 mg/mL. In this case, the amount of aggregate of carbon nanotubes in supernatant is measured as follows. Namely, 9 mL of supernatant is sampled away, 1 mL of liquid containing the remaining aggregate of carbon nanotubes is filtrated using a filter having a mesh of 1 μm in pore diameter, washed with water, and dried to measure the weight of the remaining aggregate of carbon nanotubes. A value that the weight of the remaining aggregate of carbon nanotubes is subtracted from 10 mg corresponds to the weight of aggregate of carbon nanotubes including in 9 mL of supernatant, based on which, it is reduced to a content per 1 mL. In this case, when the amount of aggregate of carbon nanotubes in supernatant is little, it is an aggregate of carbon nanotubes with poor dispersibility. When dispersibility is poor, thereafter upon using the dispersion liquid in various applications, since the concentration of aggregate of carbon nanotubes in the dispersion liquid is dilute, it becomes difficult to adjust the surface resistance when coated on a film, and a cost problem arises due to low yield.

The aggregate of carbon nanotubes of the present invention preferably includes multi-walled carbon nanotubes. From the point of transparent conductive characteristics, a double-walled carbon nanotube is more preferable, when observed by a transmission electron microscope, it is preferable that 50 or more of 100 carbon nanotubes are double-walled carbon nanotubes. The number of double-walled carbon nanotubes in an aggregate of carbon nanotubes is more preferably 70 or more of 100, and particularly preferably 75 or more. Although all may be double-walled carbon nanotubes, practically from the points of physical properties obtained and production efficiency, the upper limit of the number of double-walled carbon nanotubes is preferably not more than 95 of 100.

The number of double-walled carbon nanotubes in the aggregate of carbon nanotubes can be determined as follows. It is observed at a magnification of 400000 using a transmission electron microscope, in a view of 75 nm square, 100 pieces of carbon nanotubes randomly selected from a view that 10% or more of view area is aggregates of carbon nanotubes are evaluated for the number of layers to confirm the number of double-walled carbon nanotubes. In the case where 100 pieces in one view cannot be measured, it is measured from a plurality of views till reaching 100 pieces. In this case, one piece of carbon nanotube will count as one piece when part of a carbon nanotube is seen in a view, and both ends must not necessarily be seen. Further, even when it is recognized as two pieces in a view, they may be connected outside the view into one piece, but in this case, it will count as two pieces.

Further, in the aggregate of carbon nanotubes of the present invention, the fewer the defects in graphite sheets of carbon nanotubes, the more preferable because quality is good and electrical conductivity is improved. These defects in graphite sheets can be evaluated by a Raman spectroscopic analysis method. There are various laser wavelengths used in a Raman spectroscopic analysis method, herein, wavelengths of 532 nm and 633 nm are utilized. In a Raman spectrum, and a Raman shift observed around 1590 $cm^{-1}$ is called G band derived from graphite, and a Raman shift observed around 1350 $cm^{-1}$ is called D band derived from amorphous carbon or defect of graphite. For measuring the quality of aggregate of carbon nanotubes, a ratio of G band to D band in height (G/D ratio) in a Raman spectroscopic analysis is used. The higher G/D ratio of aggregate of carbon nanotubes is, the higher the degree of graphitization is, which is high quality. Herein, when the Raman G/D ratio is evaluated, wavelength of 532 nm is used. A higher Raman G/D ratio is better, when it is 30 or more, it can be said to be a high-quality aggregate of carbon nanotubes. The G/D ratio is preferably 40 or more, and 200 or less, further preferably 50 or more, and 150 or less. In a Raman spectroscopic analysis method of solid such as an aggregate of carbon nanotubes, variation occurs depending on sampling. Then the Raman spectroscopic analysis is carried out at least three different places, and an arithmetic average of which is to be taken.

The aggregate of carbon nanotubes used in the present invention preferably satisfies further three conditions as follows.

Peaks are observed at 140±10 $cm^{-1}$, 160±10 $cm^{-1}$, 180±10 $cm^{-1}$, 270±10 $cm^{-1}$, and 320±10 $cm^{-1}$ by Raman spectroscopic analysis of wavelength 532 nm.

A peak is observed at 220±10 $cm^{-1}$ by Raman spectroscopic analysis of wavelength 633 nm.

No peak is observed in a region from more than 190 $cm^{-1}$ to less than 260 $cm^{-1}$ by Raman spectroscopic analysis of wavelength 532 nm.

Since wave numbers of Raman spectroscopic analysis vary depending on measuring conditions, the wave number specified herein is to be specified in a range of a wave number±10 $cm^{-1}$. In the foregoing, for example, when there is a peak right at 150 $cm^{-1}$, the peak enters in either range of 140±10 $cm^{-1}$ and 160±10 $cm^{-1}$. In this case, it is thought to be present in both ranges of 140±10 $cm^{-1}$ and 160±10 $cm^{-1}$. Additionally, according to the following thought, in the case that assignment of a peak is considered from the correlation of a peak in a Raman spectrum and the diameter of a carbon nanotube, there is a case capable of construing the assignment of a peak only as either range depending on the relation to other peak. For example, in the case where there is already a peak at 140±10 $cm^{-1}$, further a peak is present at 150 $cm^{-1}$, and no peak is present at 160±10 $cm^{-1}$ other than 150 $cm^{-1}$, the peak at 150 $cm^{-1}$ can be construed as a peak at 160±10 $cm^{-1}$. The case where there is a peak right at 170 $cm^{-1}$ is the same as above.

The region of 150 to 350 $cm^{-1}$ in a Raman spectrum is called RBM (Radial Breathing Mode), and peaks observed in this region has the following correlation to diameters of carbon nanotubes. Therefore, the diameter of a carbon nanotube can be estimated from a peak observed in this region. When a diameter of carbon nanotube is written as d (nm), and a Raman shift is written as ν ($cm^{-1}$), which are related to d=248/ν. From this relation, peaks observed at 140 $cm^{-1}$, 160 $cm^{-1}$, 180 $cm^{-1}$, 270 $cm^{-1}$, and 320 $cm^{-1}$ by Raman spectroscopic analysis of wavelength 532 nm indicate the presence of carbon nanotubes having diameters of 1.77 nm, 1.55 nm, 1.38 nm, 0.92 nm and 0.78 nm, respectively. In the same manner, a peak observed at 220 $cm^{-1}$ by Raman spectroscopic analysis of wavelength 633 nm indicates the presence of a carbon nanotube having a diameter of 1.13 nm. Generally, the distance between graphite layers of a double-walled carbon nanotube is about 0.34 nm, since the diameter difference between the inner layer and outer layer of a double-walled carbon nanotube is presumed to be about 0.68 nm, carbon nanotubes having the above-described peaks are double-walled carbon nanotubes with outer diameters of 1.77 nm, 1.55 nm and 1.38 nm, respectively, and diameters of the inside layers (that is, inner diameters) are presumed to be 1.13 nm, 0.92 nm and 0.78 nm, respectively. Namely, a preferable carbon nanotube in the present invention is a double-walled carbon nanotube with a certain degree of width in the diameter distribution.

The fact that no peak is observed in a region from more than 190 $cm^{-1}$ to less than 260 $cm^{-1}$ by Raman spectroscopic analysis of wavelength 532 nm means that a single-walled carbon nanotube is hardly present or completely not present. Herein, the fact that no peak is observed in a region from more than 190 $cm^{-1}$ to less than 260 $cm^{-1}$ means that no peak exceeding 10% in peak height of 270±10 $cm^{-1}$ is present. It may not matter that a peak-like one is slightly observed or noises etc. are observed.

As for the reason why the aggregate of carbon nanotubes of the present invention is good in dispersibility, it is thought that there is a certain degree of width in the diameter distribution for one reason. When the diameters are uniformed, it is presumed that interactions working between carbon nanotubes become strong, which forms and maintains bundles firmly. By contrast, in the present invention, as shown in a Raman spectroscopic analysis, carbon nanotubes have a certain degree of the diameter distribution, thus it is presumed that interactions forming and maintaining bundles are relatively weak. It is presumed that another reason is a relatively large average diameter of the carbon nanotubes. The carbon nanotube of the present invention is larger in diameter than a single-walled carbon nanotube, further relatively thick among double-walled carbon nanotubes. Therefore, it is thought that bundles are easily dissociated and the dispersibility is good.

The aggregate of carbon nanotubes of the present invention is very good in dispersibility, and it can provide a film with both high transparency and high electrical conductivity. Namely, the aggregate of carbon nanotubes is made into a dispersion liquid by a specific method, which is coated on a substrate by a specific method, light transmittance and surface resistance of the transparent conductive film obtained are measured, thereby the dispersibility of the aggregate of carbon nanotubes can be evaluated. From the aggregate of carbon nanotubes of the present invention, it is possible to obtain a transparent conductive film with a light transmittance of 85% or more and a surface resistance of less than $1\times10^5 \Omega/\square$. In the transmittance of conductive film, transmittance of conductive film/light transmittance of transparent substrate>0.85 is preferable, and 0.99> transmittance of conductive film/light transmittance of transparent substrate>0.90 is more preferable. The surface resistance of conductive film is preferably less than $1\times10^4 \Omega/\square$, and more preferably $1\times10^2 \Omega/\square$ or more, and less than $5\times10^3 \Omega/\square$.

A dispersion liquid of aggregate of carbon nanotubes used for measurements of the above-described light transmittance and surface resistance is prepared as follows. A mixture of 10 mg of aggregate of carbon nanotubes, 30 mg of sodium polystyrene sulfonate (weight average molecular weight of 200000, manufactured by Sigma-Aldrich Corporation) and 10 mL of water is subjected to dispersion treatment under ice cooling for 20 minutes at an output power of 25 W using an ultrasonic homogenizer, subsequently subjected to centrifugal treatment at 20000 G for 15 minutes, then 9 mL of supernatant is sampled to prepare a dispersion liquid. To 300 μL of this dispersion liquid, 300 μL of methanol/water (weight ratio 1/1) is added as a wetting agent, then, coated on a polyethylene terephthalate (PET) film (manufactured by Toray Industries Inc., "LUMIRROR (trademark) U36," 15 cm 10 cm) using a bar coater (No. 8, coating thickness of 12 μm), air-dried, then rinsed with distilled water, and dried at 60° C. in an drier for 2 minutes, thereby to fix the aggregate of carbon nanotubes on the film.

Light transmittance of a conductive film is measured using a spectrophotometer with a light source of 550 nm. Electrical conductivity of a conductive film is evaluated by measuring a surface resistance of film. The surface resistance can be measured using a 4-terminal 4-probe method according to JIS K7149 (established December, 1994), for example, by Loresta EPMCP-T360 (manufactured by Dia Instruments Co., Ltd.). In high resistance measurement, for example, it can be measured using Hiresta UP MCP-HT450 (manufactured by Dia Instruments Co., Ltd., 10 V, 10 seconds).

The aggregate of carbon nanotubes of the present invention can be used as a dispersion by dispersing it in a dispersant or resin. When an aggregate of carbon nanotubes is dispersed in a liquid dispersant, it is sometimes also called a dispersion liquid.

The preparation method of aggregate of carbon nanotubes is not particularly restricted. For example, when a dispersant is a solvent, an aggregate of carbon nanotubes, a dispersant and a solvent are mixed using a known mixing/dispersing machine (for example, ball mill, bead mill, sand mill, roll mill, homogenizer, attritor, dissolver, paint shaker and the like) to be able to produce a dispersion liquid.

The above-described dispersion liquid is preferably centrifuged or filtered before coating. By centrifuging the dispersion liquid, undispersed carbon nanotubes, excess amount of dispersant, metal catalysts that may be mixed in synthesis of carbon nanotubes and the like precipitate, thus, supernatant is collected after centrifugal separation, which can remove undispersed carbon nanotubes and impurities and the like as a precipitate. Re-aggregation of carbon nanotubes can be prevented thereby, and stability of the dispersion liquid can be improved. Further, when centrifugal separation fits a condition, fractionation can be done by thickness or length of carbon nanotubes, and light transmittance of the resulting conductive film can be improved.

Centrifugal force in centrifugal separation may be 100 G or more, preferably 1000 G or more, and more preferably 10,000 G or more. The upper limit is not particularly limited, but not more than 200,000 G is preferable from the performance of general-purpose ultracentrifugal machines.

A filter used in filtration can be suitably chosen from 0.05 μm to 0.2 μm. Thereby it is possible to remove materials having a relatively large size among undispersed carbon nanotubes, impurities that may be mixed in synthesis of carbon nanotubes and the like.

In carrying out size fractionation, taking the amount of carbon nanotubes to be fractionated into account, preparation is done so that the composition of dispersion liquid after size fractionation is in the above-described range. Determination of the mixing ratio of each component before size fractionation is done by drying the precipitate after centrifugal separation and fractionated materials left on a filter, weighing after burning at 400° C. for 1 hour and calculating the concentration. As a result of such size fractionation, it is possible to separate carbon nanotubes by the length of carbon nanotube, the number of layers, other properties, presence of bundle structures or the like.

As a dispersant, surfactants, various polymer materials and the like can be used. The dispersant helps to improve dispersive power, dispersion stabilizing ability of aggregate of carbon nanotubes and the like. Surfactants are classified into an ionic surfactant and a nonionic surfactant, both surfactants can be used in the present invention. As the surfactant, for example, following surfactants are mentioned. Such surfactants can be used alone or in mixture of 2 kinds or more thereof.

Ionic surfactants are classified into a cationic surfactant, an amphoteric surfactant and an anionic surfactant. As a cationic surfactant, alkylamine salt, quaternary ammonium salt and the like are listed. As an amphoteric surfactant, there are an alkyl betaine type surfactant, amine oxide type surfactant and the like. As an anionic surfactant, there are listed alkylbenzenesulfonate such as dodecylbenzenesulfonate, and aromatic sulfonic acid type surfactant such as dodecyl phenyl ether sulfonate, a monosoap type anionic surfactant, ether sulfate type surfactant, phosphate type surfactant and carboxylic acid type surfactant. Among these, one containing an aromatic ring, namely an aromatic type ionic surfactant is preferable because it is excellent in dispersive ability, dispersion stabilizing ability and higher concentration, in particular, an aromatic type ionic surfactant such as alkylbenzenesulfonate and dodecyl phenyl ether sulfonate is preferable.

As an example of the nonionic type surfactant, there are listed a sugar ester type surfactant such as sorbitan fatty ester and polyoxyethylene sorbitan fatty ester; fatty ester type surfactant such as polyoxyethylene fatty ester and polyoxyethylene fatty diester, an ether type surfactant such as polyoxyethylene alkyl ether, polyoxyethylene alkyl phenyl ether and polyoxyethylene polypropylene glycol, and an aromatic type nonionic surfactant such as polyoxyalkylene octyl phenyl ether, polyoxyalkylene nonyl phenyl ether, polyoxyalkyl dibutyl phenyl ether, polyoxyalkyl styryl phenyl ether, polyoxyalkyl benzyl phenyl ether, polyoxyalkyl biphenyl ether and polyoxyalkyl cumyl phenyl ether. Above all, an aromatic type nonionic surfactant is preferable because it is excellent in dispersive power, dispersion stabilizing ability and higher concentration, in particular, polyoxyethylene phenyl ether is preferable.

As various polymer materials, for example, there are a water-soluble polymer such as polyvinyl alcohol, polyvinyl pyrrolidone, ammonium polystyrene sulfonate and sodium polystyrene sulfonate; and a sugar polymer such as carboxymethyl cellulose and the salt, (sodium salt, ammonium salt and the like), methyl cellulose, hydroxyethyl cellulose, amylose, cycloamylose and chitosan. Further, there can be used a conductive polymer such as polythiophene, polyethylene dioxythiophene, polyisothianaphthene, polyaniline, polypyrrole and polyacetylene, and their derivatives. Above all, it is preferable to use a water-soluble polymer such as ammonium polystyrene sulfonate and sodium polystyrene sulfonate because conductive properties of aggregate of carbon nanotubes can be efficiently exhibited.

When water is used as a dispersion media, it is most preferable that a compound having a benzene ring and a hydrophilic group such as ammonium polystyrene sulfonate and sodium polystyrene sulfonate is used as a dispersant. The reason is that a benzene ring and a hydrophilic group have strong affinity with carbon nanotubes and water, respectively. From this fact, the dispersant works effectively to disperse carbon nanotubes in water. A hydrophilic group is preferably ionic. This is because hydrophilic groups are repelled each other to part carbon nanotubes mutually.

The dispersion media of aggregate of carbon nanotubes is not particularly restricted. An aqueous solvent or a nonaqueous solvent may be used. As a nonaqueous solvent, there can be used hydrocarbons (toluene, xylene, etc.), chlorine-containing hydrocarbons (methylene chloride, chloroform, chlorobenzene, etc.), ethers (dioxane, tetrahydrofuran, methyl cellosolve, etc.), ether alcohol (ethoxyethanol, methoxyethanol, etc.), esters (methyl acetate, ethyl acetate, etc.), ketones (cyclohexanone, methyl ethyl ketone, etc.), alcohols (ethanol, isopropanol, phenol, etc.), lower carboxylic acid (acetic acid, etc.), amines (triethylamine, trimethanolamine, etc.), nitrogen-containing polar solvent (N,N-dimethylformamide, nitromethane, N-methyl pyrrolidone, etc.), and sulfur compounds (dimethyl sulfoxide, etc.).

Among these, as the dispersion media, it is preferable that a dispersion media contains water, alcohol, toluene, acetone or ether, and a combined solvent thereof. When an aqueous solvent is required, and when a binder is used as described below and the binder is an inorganic polymer type binder, polar solvents such as water, alcohols and amines are used. As described below, when a liquid one at room temperature is used as a binder, it can be also used as a dispersion media in itself.

A preferable mixing ratio of each component in the above-described dispersion is as follows. The concentration of aggregate of carbon nanotubes is preferably 0.01 weight % or more, and 20 weight % or less, and more preferably 0.01 to 10 weight %.

The content of a dispersant is not particularly limited, but it is preferably 0.01 to 50 weight %, more preferably 0.01 to 30 weight %. The mixing ratio of the above-described dispersant and an aggregate of carbon nanotubes is not particularly limited, but it is preferably 0.1 to 20 in weight ratio of the dispersant/aggregate of carbon nanotubes, and more preferably 0.3 to 10. The aggregate of carbon nanotubes of the present invention is excellent in dispersibility, so it can also be used in such manner that a dispersion liquid with higher concentration than a desired content of carbon nanotubes is once prepared, which is diluted with a solvent for use in the desired concentration.

After such dispersion liquid of aggregate of carbon nanotubes is prepared, a conductive film can be formed by coating it on a substrate. The method for coating a dispersion liquid of aggregate of carbon nanotubes is not particularly limited. Known coating methods can be utilized, for example, including spray coating, immersion coating, spin coating, knife coating, kiss coating, gravure coating, screen printing, inkjet printing, pad printing, other kind of printing, or roll coating. Coating may be done several times, and coating may be combination of different two kinds of coating methods. Most preferable coating method is roll coating.

Coating thickness of dispersion liquid (wet thickness) depends also on the concentration of coating liquid, thus it is not needed to be particularly specified as long as a desired light transmittance and surface resistance is obtained, and it is preferably from 0.1 µm to 50 µm. It is further preferably from 1 µm to 20 µm.

When an aqueous dispersion liquid of aggregate of carbon nanotubes is coated on a substrate, a wetting agent may be added to the dispersion liquid. In particular, when coated on a nonhydrophilic substrate, adding a wetting agent such as surfactant and alcohol to a dispersion liquid can coat the dispersion liquid on the substrate without being shed. As a wetting agent, alcohols are preferable, among alcohols, methanol or ethanol is preferable. Since lower alcohols such as methanol and ethanol are highly volatile, they can be easily removed in drying a substrate after coating. In some cases, a mixed solution of alcohol and water may be used.

In this way, regarding a conductive film that a dispersion liquid of aggregate of carbon nanotubes is coated, after the dispersion liquid is coated on a substrate, unnecessary dispersion media can be removed by methods such as air drying, heating and reduced pressure. The aggregate of carbon nanotubes thereby forms a three dimensional network structure, which is fixed on the substrate. Thereafter, the dispersant being a component in the liquid is removed by using a suitable solvent. By this operation, dispersion of charge becomes easy, and electrical conductivity of a transparent conductive film is improved.

As a solvent to remove the above-described dispersant, it is not particularly limited as long as it dissolves the dispersant, it may be an aqueous solvent or nonaqueous solvent. Specifically, when it is an aqueous solvent, water, alcohols and acetonitrile are listed, when it is a nonaqueous solvent, chloroform, toluene and the like are listed.

After a transparent conductive film is formed by coating a dispersion liquid including the aggregate of carbon nanotubes on a substrate as described above, it is also preferable that this film is overcoated with a binder material capable of forming an organic or inorganic transparent membrane. Overcoating is effective on further dispersion and transfer of charge.

The transparent conductive film can be also obtained in such manner that a binder material capable of forming an organic or inorganic transparent membrane is contained in a dispersion liquid including an aggregate of carbon nanotubes, and coated on a substrate, then according to need, heated to dry or bake (harden) a coated film. The heating condition in this case is set suitably according to the kind of binder. When the binder is a light or radiation hardening type, not by heat hardening, a coated film is irradiated by light or radioactive ray right after coating, thereby to harden the coated film. As radiation, ionic radiation such as electric beam, ultraviolet light, X-ray and gamma ray can be used, and irradiation dose is determined according to the kind of binder.

As the binder material, it is not particularly limited as long as it is used as conductive paints, there can be used various organic and inorganic binders, namely, a transparent organic polymer or the precursor (hereinafter, sometimes called "organic polymer type binder") or, inorganic polymer or the precursor (hereinafter, sometimes called "inorganic polymer type binder"). The organic polymer type binder may be any one of thermoplastic, thermosetting or radiation (ultraviolet, electron beam etc.) hardening ones. As examples of the suitable organic binder, there are organic polymers such as polyolefin (polyethylene, polypropylene, etc.), polyamide (nylon 6, nylon 11, nylon 66, nylon 6,10, etc.), polyester (polyethylene terephthalate, polybutylene terephthalate, etc.), silicone resin, vinyl resin (polyvinyl chloride, polyvinylidene chloride, polyacrylonitrile, polyacrylate, polystyrene derivative, polyvinyl acetate, polyvinyl alcohol, etc.), polyketone, polyimide, polycarbonate, polysulfone, polyacetal, fluorocarbon resin, phenol resin, urea resin, melamine resin, epoxy resin, polyurethane, cellulosic polymer, proteins (gelatin, casein, etc.), chitin, polypeptide, polysaccharides and polynucleotide, and precursors of these polymers (monomer or oligomer). These can form a transparent membrane or matrix only by evaporation of solvent, or heat hardening, or hardening by irradiation of light or radiation.

A preferable organic polymer type binder is a compound having an unsaturated bond capable of radical polymerization hardening by radiation or light, which is a monomer having a vinyl group or a vinylidene group, its oligomer or polymer. As this kind of monomer, there are styrene derivatives (styrene, methyl styrene, etc.); acrylic acid, methacrylic acid or their derivatives (alkyl acrylate or methacrylate, allyl acrylate or methacrylate, etc.); vinyl acetate, acrylonitrile, itaconic acid and the like. The oligomer or polymer is preferably a compound having a double bond in a main chain, or a compound having an acryloyl or methacryloyl group in both terminals of a straight chain. This kind of radical polymerization hardening binder has high hardness and excellent abrasion resistance, and can form a membrane or matrix with high degree of transparency.

As examples of the inorganic polymer type binder, there are sol of metal oxide such as silica, tin oxide, aluminum oxide and zirconium oxide, or a hydrolysable or thermally-degradable organic metal compound which becomes a precursor of inorganic polymer (organic phosphorous compound, organic boron compound, organic silane compound, organic titanium compound, organic zirconium compound, organic lead compound, organic alkaline earth metal compound, etc.). As specific examples of the hydrolysable or thermally-degradable organic metal compound, they are metal complexes of alkoxide or the partial hydrolysate, lower carboxylate such as acetate, and acetyl acetone etc.

When these inorganic type binders are burned, a glassy inorganic polymer type transparent membrane or matrix composed of oxide or composite oxide can be formed. The inorganic polymer type matrix is generally glassy, high in hardness, excellent in abrasion resistance, and also high in transparency.

The used amount of binder may be an amount sufficient to overcoat, or a sufficient amount to obtain a suitable viscosity for coating when mixed in a liquid. When it is too small, coating does not work well, and when too large, electrical conductivity is damaged, which is bad.

As the dispersion media used in the present invention, the foregoing solvent is generally used, in the case of an organic polymer type binder of light hardening or radiation hardening, a solvent-free dispersion can be obtained by choosing a liquid binder at normal temperature. From this, evaporation of solvent in hardening and drying the coat does not occur and hardening time is greatly shortened, and the recovery operation of solvent becomes unnecessary.

In a dispersion of the aggregate of carbon nanotubes of the present invention, according to need, additives such as coupling agent, crosslinker, stabilizer, antisettling agent, coloring agent, charge adjusting agent and lubricant can be added.

The dispersion of the aggregate of carbon nanotubes of the present invention can further contain a conductive organic material, a conductive inorganic material or a combination of these materials other than the aggregate of carbon nanotubes of the present invention.

As the conductive organic material, there can be used buckyball, carbon black, fullerene, various kinds of carbon nanotubes, and particles including these, organic acid such as sulfonic acid, an organic compound having an acceptor structure in a molecule such as tetracyanoquinodimethane (TCNQ), trinitrofluorenone (TNF) and chloranile.

As the conductive inorganic material, there are listed aluminum, antimony, beryllium, cadmium, chrome, cobalt, copper, dope metal oxide, iron, gold, lead, manganese, magnesium, mercury, metal oxide, nickel, platinum, silver, steel, titanium, zinc and particles including these. Preferable are indium tin oxide, antimony tin oxide and a mixture thereof.

A film obtained by containing or overcoating these conductive materials is very advantageous in dispersion or transfer of charge. Further, a layer containing a conductive material other than the aggregate of carbon nanotubes and a layer containing the aggregate of carbon nanotubes may be laminated.

A film which becomes a substrate of a conductive film is not particularly restricted. When transparency is necessary, a transparent film, for example, PET film is suitable.

The conductive film of the present invention can be used while being bonded with a substrate, or it is detached from the substrate, and used as a self-supporting film. In order to produce a self-supporting film, for example, after an organic polymer type binder is further coated on a transparent conductive film, the substrate may be detached. Further, it can be used in such manner that a substrate in production is burned out by thermal decomposition, or it is melted to transfer the conductive film onto other substrate. In this case, a thermal decomposition temperature of a substrate in production is preferably lower than that of a transfer substrate.

The thickness of the conductive film of the present invention can cover various ranges. For example, the conductive film of the present invention can be between about 0.5 nm and about 1000 µm in thickness. The thickness of the conductive film is preferably about 0.005 to about 1000 µm, more preferably about 0.05 to about 500 µm, further preferably about 1.0 to about 200 µm, and further preferably about 1.0 to about 50 µm.

The conductive film of the present invention thus obtained is a conductive film that an aggregate of carbon nanotubes is laminated on a substrate, which has a light transmittance of 85% or more, and a surface resistance of less than $1 \times 10^5 \Omega/\square$.

Transmittance of conductive film is preferably transmittance of conductive film/light transmittance of transparent substrate>0.85, and more preferably 0.99>transmittance of conductive film/light transmittance of transparent substrate>0.90. Surface resistance of conductive film is more preferably less than $1\times10^4\Omega/\square$, and further preferably $1\times10^2\Omega/\square$ or more, and less than $5\times10^3\Omega/\square$.

In the present invention, the aggregate of carbon nanotubes can be also dispersed using a resin as dispersion media to be a dispersion. In this case, the resin used is not particularly limited, either a thermoplastic resin or a thermosetting resin can be used. A thermoplastic resin denotes a resin capable of thermal molding by heating. As the specific example, there are listed a polyethylene resin, polypropylene resin, polystyrene resin, rubber-modified polystyrene resin, acrylonitrile-butadiene-styrene (ABS) resin, acrylonitrile-styrene (AS) resin, polymethyl methacrylate resin, acryl resin, polyvinyl chloride resin, polyvinylidene chloride resin, polyethylene terephthalate resin, ethylene vinyl alcohol resin, cellulose acetate resin, ionomer resin, polyacrylonitrile resin, polyamide resin, polyacetal resin, polybutylene terephthalate resin, polylactic acid resin, polyphenylene ether resin, modified polyphenylene ether resin, polycarbonate resin, polysulfone resin, polyphenylene sulfide resin, polyetherimide resin, polyethersulfone resin, polyallylate resin, thermoplastic polyimide resin, polyamideimide resin, polyetheretherketone resin, polyketone resin, liquid crystal polyester resin, fluorocarbon resin, syndiotactic polystyrene resin, cyclic polyolefin resin and the like. These thermoplastic resins can be used in one kind, or in concomitant use of 2-kinds or more thereof. A thermosetting resin denotes a resin having a characteristic capable of being converted to be substantially insoluble and infusible in hardening by heating, irradiation of radiation, addition of catalyst and the like. As the specific example, there are listed a phenol resin, urea resin, melamine resin, benzoguanamine resin, alkyd resin, unsaturated polyester resin, vinylester resin, diallyl terephthalate resin, epoxy resin, silicone resin, urethane resin, furan resin, ketone resin, xylene resin, thermosetting polyimide resin and the like. These thermosetting resins can be used in one kind, or in concomitant use of 2-kinds or more thereof. Further, when the main component of resin is a thermoplastic resin, a small amount of thermosetting resin can be added in a range not damaging the characteristic of thermoplastic resin, reversely, when the main component is a thermosetting resin, a small amount of thermoplastic resin can be added in a range not damaging the characteristic of thermosetting resin.

The amount of carbon nanotubes added in a resin is not particularly restricted. Generally, it is 0.01 to 50 weight %, preferably 0.01 to 20 weight %, and more preferably 0.1 to 10 weight %. When the added amount is too large, the characteristic of a base resin is sometimes lost, so the smaller the added amount of carbon nanotubes the better.

The method for dispersing carbon nanotubes in a resin is not particularly restricted. As the specific method, any following method may be used: a method that a resin is dispersed in a solvent, in a state of the resin solution, carbon nanotubes are added, and dispersed by stirring and mixing, then the solvent is removed; a method that in a state of a thermoplastic resin heated and melted, carbon nanotubes are added, and dispersed by a melt kneading machine such as mixer, kneader and extruder; in the case of thermosetting resin, a method that carbon nanotubes are added in a monomer or prepolymer before hardening, dispersed by stirring and mixing, then the resin is hardened; and a method that carbon nanotubes are added in a monomer, dispersed by stirring and mixing, then polymerized.

The method for producing an aggregate of carbon nanotubes is not limited as long as the aggregate of carbon nanotubes specified by the present invention is obtained, for example, the following production methods are exemplified.

A powdery catalyst supporting iron on magnesia is disposed in a vertical reactor over the whole area in a horizontal cross section direction of the reactor, by flowing methane in a vertical direction inside the reactor, methane is contacted with said catalyst at 500 to 1200° C. to produce an aggregate of carbon nanotubes, then, the aggregate of carbon nanotubes is subjected to oxidation treatment.

By supporting iron on magnesia, the particle diameter of iron is easily controlled, and sintering hardly occurs under high temperature even when iron is present in high density. Therefore, it is possible to efficiently synthesize a lot of carbon nanotubes with high quality. Further, since magnesia dissolves in an acidic aqueous solution, only by being treated with an acidic aqueous solution, both magnesia and iron can be removed, which can simplify a purification process.

Regarding magnesia, a commercial product may be used or one synthesized may be used. As a preferable production method of magnesia, there are methods where magnesium metal is heated in air, magnesium hydroxide is heated at 850° C. or more, and magnesium hydroxide carbonate $3MgCO_3 \cdot Mg(OH)_2 \cdot 3H_2O$ is heated at 950° C. or more.

Among magnesia, light magnesia is preferable. Light magnesia is magnesia with a low bulk density. The bulk density of light magnesia is preferably 0.20 g/mL or less, and more preferably 0.05 to 0.16 g/mL from the point of flowability of catalyst. The bulk density of powder is sometimes influenced by temperature and humidity in measurement. Bulk density herein is a value when measured at temperature of $20\pm10°$ C. and humidity of $60\pm10\%$.

Iron to be supported on magnesia is not limited to a zerovalent state. It can be assumed to be a zerovalent state during reaction, but it may a compound widely containing iron, or iron species. For example, there are used organic salts or inorganic salts such as iron formate, iron acetate, iron trifluoroacetate, iron ammonium citrate, iron nitrate, iron sulfate and iron halide; and complex salts such as ethylenediaminetetraacetate complex and acetylacetonate complex. Iron is preferably a fine particle. The particle diameter of a fine particle is preferably 0.5 to 10 nm. When iron is a fine particle, a carbon nanotube with a small outer diameter tends to be produced.

The method to support iron on magnesia is not particularly restricted. For example, magnesia is immersed in nonaqueous solution (for example, ethanol solution) or aqueous solution that salt of iron to be supported was dissolved, sufficiently dispersed and mixed by stirring or ultrasonic irradiation, then dried (immersion method). Further, iron may be supported on magnesia by heating at high temperatures (300 to 1000° C.) in a gas selected from air, oxygen, nitrogen, hydrogen, inert gas and mixed gas thereof, or in vacuum.

The more the supported amount of iron is, the higher the yield of carbon nanotubes becomes, but when too much, the particle diameter of iron becomes large, and the carbon nanotube produced becomes thick. When the supported amount of iron is small, the particle diameter of iron to be supported becomes small, and a carbon nanotube with a small outer diameter is obtained, but the yield tends to be lowered. The optimum supported amount of iron differs depending on the pore content, outer surface area of magnesia and supporting method, it is preferable to support iron by 0.1 to 20 weight % relative to magnesia, and 0.2 to 10 weight % is particularly preferable.

The magnesia supporting iron thus obtained is filled in a vertical reactor. The reactor is preferably heat-resistant, and it is preferably made of heat-resistant materials such as quartz and alumina.

Herein, a vertical reactor has a reactor disposed in a vertical direction (hereinafter, sometimes called "longitudinal direction"), equipping a mechanism that methane flows in a direction from one end of the reactor toward the other end, and methane flows in a state passing through a catalyst layer formed by a catalyst for producing an aggregate of carbon nanotubes. For the reactor, for example, a reactor of tubular shape is preferably used. Additionally, the vertical direction described above includes a direction having some angle of gradient to a vertical direction (for example, 90°±15° to a horizontal plane, preferably) 90°±10°. Additionally, a vertical direction is preferable. Additionally, a feed section and a discharge section of methane are not necessarily ends of a reactor, it is enough that methane flows in the above-described direction and passes through a catalyst layer during the flowing process.

In a vertical reactor, it is preferable that a catalyst be present over the whole area in a horizontal cross section direction of the reactor. By doing so, it is possible to contact the catalyst with methane effectively. In the case of a horizontal reactor, in order to make such state, a catalyst must be sandwiched from both sides against the attraction of gravity. However, in a production reaction of an aggregate of carbon nanotubes, aggregates of carbon nanotubes are produced on the catalyst as the reaction proceeds and the volume of the catalyst increases, thus a method sandwiching catalyst from both sides is not preferable. By adopting a reactor of a vertical type, equipping a table that gas can transmit inside the reactor, and placing a catalyst thereon, thereby the catalyst can be uniformly present in the cross section direction of the reactor without sandwiching the catalyst from both sides. In the case of vertical reactors described in Non-patent documents 2, 3, 4 and Patent document 1, since raw gas contacts only the surface of a catalyst, no carbon nanotubes are produced inside the catalyst. As for each catalyst particle, the area that gas makes contact is limited, so the region that carbon nanotubes grow becomes narrow. Namely, because carbon nanotubes grow thickly, it is thought that a thick bundle is formed in no time, and the dispersibility becomes bad. The inside of a catalyst hardly contacts with raw gas, thus there is a problem that the yield of carbon nanotubes decreases extremely. In the case of a vertical reactor, raw gas uniformly contacts with the whole catalyst, thus it is thought that an aggregate of carbon nanotubes uniformly grows on catalyst particle, a bundle is thin, and carbon nanotubes extremely excellent in dispersibility are obtained. Here, the state that catalyst is present over the whole area in the horizontal cross section direction of a vertical reactor means that catalysts spread entirely in the horizontal cross section direction and a table at the bottom of catalyst is not seen. As preferable embodiments of such state, for example, there are the following modes.

A: A table for placing a catalyst that gas can transmit in a reactor (ceramic filter, etc.) is equipped, a catalyst is filled thereon by a predetermined thickness. The up and down sides of this catalyst layer may be somewhat concave-convex (FIG. 1 (a)). FIG. 1 (a) is a conceptual illustration showing a state that a table 2 for placing a catalyst is equipped in a reactor 1, on which a catalyst 3 is present entirely in the horizontal cross section direction of the reactor.

B: On the same table for placing a catalyst as in A, a catalyst and a material other than a catalyst (filler) are mixed and filled. Although this catalyst layer is preferably uniform, it may be somewhat concave-convex (FIG. 1 (b)). FIG. 1 (b) is a conceptual illustration showing a state that a table 2 for placing a catalyst is equipped in a reactor 1, on which a mixture 4 of a catalyst and a material other than a catalyst is present entirely in the cross section direction of the reactor.

C: It is a state that a catalyst is dropped from the upper part of a reactor by spraying or the like, and catalyst powder is present uniformly via gas in the horizontal cross section direction of the reactor (FIG. 1 (c)). FIG. 1 (c) is a conceptual illustration showing a state that catalysts 5 sprayed from the upper part of a reactor 1 are spread entirely in the horizontal cross section direction of the reactor.

The vertical reactor may be either a fluid bed type or a fixed bed type. As one example of the fluid bed type, there are listed a mode that a catalyst is dropped from the upper part of a reactor by spraying or the like as described in C, and a mode that a catalyst flows generally being called a boiling bed type (method being accordance with the foregoing A or B). As an example of the fixed bed type, a mode like the foregoing A or B is mentioned.

In the fluid bed type, a catalyst is continuously fed, and an aggregate containing the catalyst and aggregate of carbon nanotubes after reaction is continuously drawn out, thereby a continuous synthesis is possible, which is preferable because an aggregate of carbon nanotubes can be efficiently obtained. In the present invention, magnesia is used as a support of catalyst, magnesia is very good in flowability from its particle characteristic (specific gravity, bulk density, surface charge, etc.), and in particular, it is suitable for synthesizing an aggregate of carbon nanotubes in a fluid bed reactor. In the case where a magnesia support is used for catalyst, when an aggregate of carbon nanotubes is synthesized in a fluid bed type, since a fluidization state is good, a long carbon nanotube tends to be produced. The long carbon nanotube defined here is a carbon nanotube with an average length of 1 μm or more. Since methane as a raw material and a catalyst are uniformly contacted resulting from good flowability in a fluid bed reactor, it is thought that synthesis reaction of carbon nanotubes is carried out uniformly, catalyst-coating with impurities such as amorphous carbon is suppressed, and catalyst activity continues for long time, resulting in obtaining a long carbon nanotube.

By passing methane from the bottom part or upper part of a catalyst layer placed in a reactor, through contact with a catalyst for reaction, an aggregate of carbon nanotubes is produced.

The temperature for contacting a catalyst with methane is preferably 500 to 1200° C., more preferably 600 to 950° C., and further preferably in a range of 700 to 900° C. When the temperature is lower than 500° C., the yield of aggregate of carbon nanotubes becomes poor. When the temperature is higher than 1200° C., carbon nanotubes start bonding and it becomes difficult to control the shape of carbon nanotube as well as materials used for a reactor are restricted. A reactor may be set to a reaction temperature while contacting with methane, or after completion of pretreatment by heat, a reactor is set to a reaction temperature, then supply of methane may be started.

Before a reaction for producing an aggregate of carbon nanotubes, a catalyst may be pretreated by heat. The time of pretreatment by heat is not particularly limited, but when it is too long, agglomeration of metal occurs, which is sometimes followed by production of carbon nanotubes with a large outer diameter, thus it is preferably within 120 minutes. The temperature of pretreatment may be equal to or lower than reaction temperature as long as catalyst activity is exhibited, may be the same as reaction temperature, or higher than reaction temperature. By conducting pretreatment, there is a case that catalyst becomes a more active state.

The pretreatment by heat and reaction for producing an aggregate of carbon nanotubes are preferably conducted in reduced pressure or atmospheric pressure.

In the case where contact of a catalyst with methane is conducted in reduced pressure, a reaction system can be in reduced pressure by a vacuum pump or the like. Further, in the case where the pretreatment and reaction are conducted in atmospheric pressure, a mixed gas of methane and a diluting gas may be contacted with a catalyst.

The diluting gas is not particularly limited, but one other than oxygen gas is preferably used. Oxygen is generally not used because of possibility of explosion, but it may be used outside the explosive range. As the diluting gas, nitrogen, argon, hydrogen, helium and the like are preferably used. These gases have effects on the control of linear velocity and concentration of methane, and as a carrier gas. Hydrogen is preferable because it has an effect on activation of catalyst metal. A gas of high molecular weight like argon has a large annealing effect, and it is preferable when annealing is targeted. In particular, nitrogen and argon are preferable.

The aggregate of carbon nanotubes produced in the production process described above includes impurities such as single-walled carbon nanotubes and amorphous carbon in addition to double-walled carbon nanotubes. In the production of the aggregate of carbon nanotubes of the present invention, the aggregate of carbon nanotubes thus produced is subjected to oxidation treatment. The oxidation treatment of the aggregate of carbon nanotubes is carried out by a method of burning treatment, a method of treatment with an oxidant or the like. By conducting such oxidation treatment, it becomes possible to selectively remove impurities such as amorphous carbon and single-walled CNT of low heat resistance in the product, and purity of double-walled carbon nanotubes can be improved.

When burning treatment is conducted as oxidation treatment, the oxidation temperature is influenced by atmosphere gas, thus it is preferable to conduct burning treatment at relatively low temperatures in the case of high oxygen concentration, and at relatively high temperatures in the case of low oxygen concentration. When burning treatment is conducted under atmosphere, the burning treatment is preferably conducted in a range of the combustion peak temperature of aggregate of carbon nanotubes±50° C. Even when burning treatment is conducted at less than the combustion peak temperature −50° C., impurities and single-walled carbon nanotubes are not removed, so purity of double-walled carbon nanotubes is not improved. When burning treatment is conducted at more than the combustion peak temperature +50° C., double-walled carbon nanotubes themselves are lost. Thus, it is preferable to be burned at around the combustion peak temperature of aggregate of carbon nanotubes. The range of the combustion peak temperature ±15° C. is further preferable. When burning treatment is conducted under atmosphere, the temperature of burning treatment is preferably selected in a range of 300 to 1000° C., and more preferably 400 to 600° C. When oxygen concentration is higher than atmosphere, a lower temperature range than that is chosen, and when oxygen concentration is lower than atmosphere, a higher temperature range than that is chosen.

The combustion peak temperature of aggregate of carbon nanotubes can be measured by conducting thermal analysis thereof. About 10 mg of a sample is placed in a differential scanning calorimeter (for example, DTG-60 manufactured by Shimadzu Corporation), raised to 900° C. from room temperature in air at a rising temperature velocity of 10° C./min. In this time, it is possible to obtain an exothermic peak temperature of a sample in combustion.

Reaction conditions can be adjusted in such manner that burning treatment time is long when burning temperature is low, and burning treatment time is short when burning temperature is high. Thus, the burning treatment time is not particularly limited as long as the carbon nanotubes of the present invention are obtained. The burning treatment time is preferably from 5 minutes to 24 hours, more preferably from 10 minutes to 12 hours, and further preferably from 30 minutes to 5 hours. Burning is preferably conducted under atmosphere, and it may be conducted under oxygen/inert gas. The oxygen concentration in this case is not particularly limited. It may be suitably set to a range of 0.1% to 100% of oxygen. As an inert gas, helium, nitrogen, argon and the like are used.

The oxidation treatment can be conducted in a method carrying out burning treatment by contacting carbon nanotubes intermittently with oxygen or a mixed gas containing oxygen. In the case that burning treatment is done by being intermittently contacted with oxygen or a mixed gas containing oxygen, treatment at relatively high temperature is possible. This is because the reaction stops immediately after oxygen is consumed even if oxidation occurs owing to intermittently flowing oxygen or a mixed gas containing oxygen. When burning treatment is conducted under atmosphere, the temperature range is preferably about 500 to 1200° C., and more preferably 600 to 950° C. As described above, in the production of carbon nanotubes, the temperature becomes about 500 to 1200° C. Thus, when burning treatment is conducted right after the production of carbon nanotubes, it is preferable to conduct such intermittent burning treatment.

In the case of using an oxidant as oxidation treatment of carbon nanotubes, a treatment method with hydrogen peroxide or mixed acid is mentioned.

When carbon nanotubes are treated with hydrogen peroxide, carbon nanotubes are mixed in a 34.5% aqueous hydrogen peroxide solution so as to be 0.01 weight % to 10 weight % for example, and reacted at 0 to 100° C. for 0.5 to 48 hours.

When carbon nanotubes are treated with a mixed acid, carbon nanotubes are blended in a mixed solution of concentrated sulfuric acid/concentrated nitric acid (3/1) so as to be 0.01 weight % to 10 weight % for example, and reacted at 0 to 100° C. for 0.5 to 48 hours. As the mixing ratio of mixed acid, according to the amount of single-walled carbon nanotubes in carbon nanotubes produced, the ratio of concentrated sulfuric acid/concentrated nitric acid can be set to 1/10 to 10/1.

After the above-described treatment with a mixed acid, treatment with a basic compound may be conducted. By treating with a basic compound, it is possible to reduce the remaining mixed acid. Further, by treating with a basic compound, an acidic group such as a carboxyl group that is thought to have been produced in impurities such as amorphous carbon is converted into a salt, and it is thought that separation of the impurities from carbon nanotubes becomes better. Namely, water solubility of the impurities increases, by filtration, it becomes possible to easily separate carbon nanotubes and impurities. The basic compound is not particularly limited, preferable are inorganic alkali salts such as sodium hydroxide, potassium hydroxide, calcium hydroxide and sodium hydrogen carbonate; and amines such as methylamine, ethylamine, propylamine, dimethylamine, diethylamine, dipropylamine, ammonia and ammonium hydroxide. Above all, lower amines with carbon numbers of 10 or less are preferable, such as methylamine, ethylamine, propylamine, dimethylamine, diethylamine and dipropylamine, and ethylamine or propylamine is further preferable, and propylamine is most preferable.

These oxidation treatments may be conducted right after the synthesis of aggregate of carbon nanotubes, or may be conducted after the purification treatment. For example, in the case of using iron/magnesia as a catalyst, after burning treatment, purification treatment may be conducted further for removing a catalyst with acids such as hydrochloric acid, or after purification treatment for removing a catalyst with acids such as hydrochloric acid, oxidation treatment may be conducted.

Hereinafter, the present invention will be further detailed with reference to Examples. However, the present invention is not limited to the following Examples.

EXAMPLES

In Examples, various evaluations of physical properties were carried out by the following methods.

[Thermal Analysis]

About 10 mg of a sample was placed in a differential scanning calorimeter (DTG-60 manufactured by Shimadzu Corporation), raised to 900° C. from room temperature in air at a rising temperature velocity of 10° C./min. Then, combustion peak temperature due to exothermic heat was read from the DTA curve.

[Raman Spectroscopic Analysis]

A powder sample was placed in a resonant Raman spectrometer (INF-300 manufactured by Horiba Jobin Yvon S.A.S.), measurement was conducted using a laser wave length of 532 nm or 633 nm. In measurement of G/D ratio, three different places were analyzed to obtain an arithmetic average thereof.

[High-Resolution Transmission Electron Microscope Image]

One mg of aggregate of carbon nanotubes was put in 1 mL of ethanol, and subjected to dispersion treatment for about 15 minutes using an ultrasonic bath. Several drops of the dispersed sample was added on a grid, and dried. The grid that the sample was coated in this manner was placed in a transmission electron microscope (JEM-2100 manufactured by JEOL Corporation) and measurement was conducted. Measurement magnification is from 50000 times to 500000 times. Acceleration voltage is 120 kV.

[Scanning Electron Microscope Image]

One mg of aggregate of carbon nanotubes was put in 1 mL of ethanol, and subjected to dispersion treatment for about 15 minutes using an ultrasonic bath. Several drops of the dispersed sample was added on a grid, and dried. The grid that the sample was coated in this manner was placed in a scanning electron microscope (JSM-630 INF manufactured by JEOL Corporation) and measurement was conducted. Measurement magnification is from 1000 times to 60000 times. Acceleration voltage is 5 kV.

[Production of Transparent Conductive Film]

To 300 µL of dispersion liquid of aggregate of carbon nanotubes, 300 µL of methanol/water (weight ratio 1/1) was added as a wetting agent, then coated on a polyethylene terephthalate (PET) film (manufactured by Toray Industries Inc., LUMIRROR (trademark) U36) using a bar coater (No. 8, coating thickness of 12 µm), air-dried, then rinsed with distilled water, and dried at 60° C. in a drier for 2 minutes, thereby to fix the aggregate of carbon nanotubes thereon.

[Measurement of Light Transmittance]

Regarding light transmittance, a film coated with the aggregate of carbon nanotubes was loaded in a spectrophotometer (U-2100 manufactured by Hitachi, Ltd.), and light transmittance of wavelength 550 nm was measured.

[Measurement of Surface Resistance]

Surface resistance was measured using a 4-terminal 4-probe method according to JIS K7149 (established December, 1994), by Loresta EPMCP-T360 (manufactured by Dia Instruments Co., Ltd.). In high resistance measurement, it was measured using Hiresta UP MCP-HT450 (manufactured by Dia Instruments Co., Ltd., 10 V, 10 seconds).

Example 1

Supporting Metal Salt on Light Magnesia 5 g of iron ammonium citrate (manufactured by Wako Pure Chemical Industries Ltd.) was dissolved in 250 mL of methanol (manufactured by Kanto Chemical Co., Ltd.). To this solution, 50 g of light magnesia (manufactured by Wako Pure Chemical Industries Ltd., bulk density was 0.16 g/mL) was added, treated for 60 minutes by an ultrasonic cleaner, and methanol was removed by drying while stirring at 40° C. to 60° C., thereby to obtain a solid catalyst that metal salt was supported on light magnesia powder.

(Synthesis of Double-Walled Carbon Nanotube)

Figure 2:
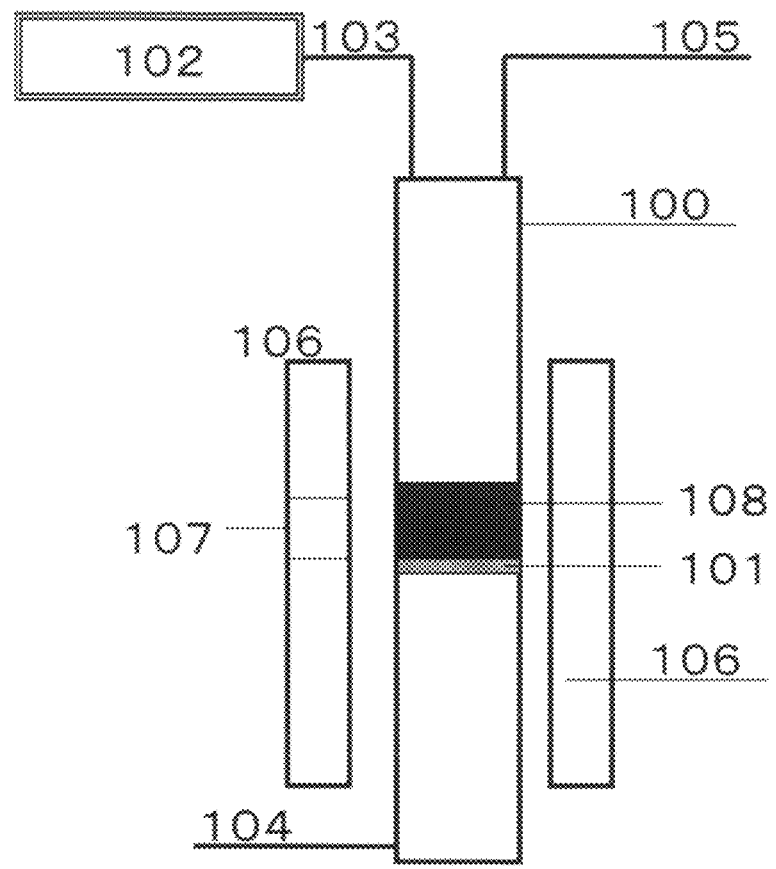
FIG. 2 is a schematic diagram of fluid bed equipment used in Example 1.

Carbon nanotubes were synthesized by a vertical reactor shown in FIG. 2.

A reactor 100 is a cylindrical quartz tube of 32 mm in inner diameter and 1200 mm in length. A quartz sintered plate 101 is equipped in the center part, an inert gas and raw gas supply line 104 is equipped in the bottom part of the quartz tube, and in the upper part thereof, a waste gas line 105, a sealed catalyst feeder 102 and a catalyst input line 103 are equipped. Further, in order to keep the reactor in an arbitrary temperature, a heater 106 surrounding the periphery of the reactor is equipped. The heater 106 is provided with an inspection port 107 to be able to confirm a flow state in equipment.

Catalyst of 12 g was sampled, and the catalyst was set on the quartz sintered plate 101 through the catalyst input line 103. Next, supply of nitrogen was started from the raw gas supply line 104 at 1000 mL/min. After inside of the reactor was replaced with nitrogen gas atmosphere, temperature was raised to 900° C. by heating (rising temperature time of 30 minutes).

After reaching 900° C., the temperature was kept, flow rate of nitrogen in the raw gas supply line 104 was increased at 2000 mL/min, fluidization of solid catalyst on the quartz sintered plate was started. After fluidization was confirmed through the inspection port 107 of heating furnace, further supply of methane was started at 95 mL/min (methane concentration of 4.5 vol %) to the reactor. After the mixed gas was supplied for 30 minutes, it was changed to the flow of nitrogen alone, thereby finishing synthesis.

Heating was stopped and being allowed to stand till room temperature, and after reaching room temperature, a composition containing the aggregate of carbon nanotubes and catalyst was taken out from the reactor. The above-described operation was repeated, and the aggregate of carbon nanotubes obtained was provided for the following processes.

Thermal analysis of the aggregate of carbon nanotubes obtained was carried out by the foregoing method. The combustion peak temperature was 511° C.

(Burning of Aggregate of Carbon Nanotubes, Purification Treatment)

30 g of the aggregate of carbon nanotubes was sampled in a porcelain dish (150ϕ)), it was raised to 500° C. over 1 hour under atmosphere in a muffle furnace (FP41 manufactured by Yamato Scientific Co., Ltd.) and maintained for 60 minutes, then cooled naturally. Further, for removing the catalyst from the above-described carbon nanotubes, purification treatment was conducted as follows. The carbon nanotubes were added to 6N aqueous hydrochloric acid solution and stirred for 2 hours in a water bath of 80° C. A recovered material obtained by filtration using a filter of 1 µm in pore diameter was further added to 6N aqueous hydrochloric acid solution and stirred for 1 hour in a water bath of 80° C. This was filtrated by using a filter of 1 μm in pore diameter, and washed with water several times, then the filtration residue was dried overnight in an oven of 120° C., which removed magnesia and metals, resulting in purification of carbon nanotubes.

(High-Resolution Transmission Electron Microscope Analysis of Aggregate of Carbon Nanotubes)

Figure 3:
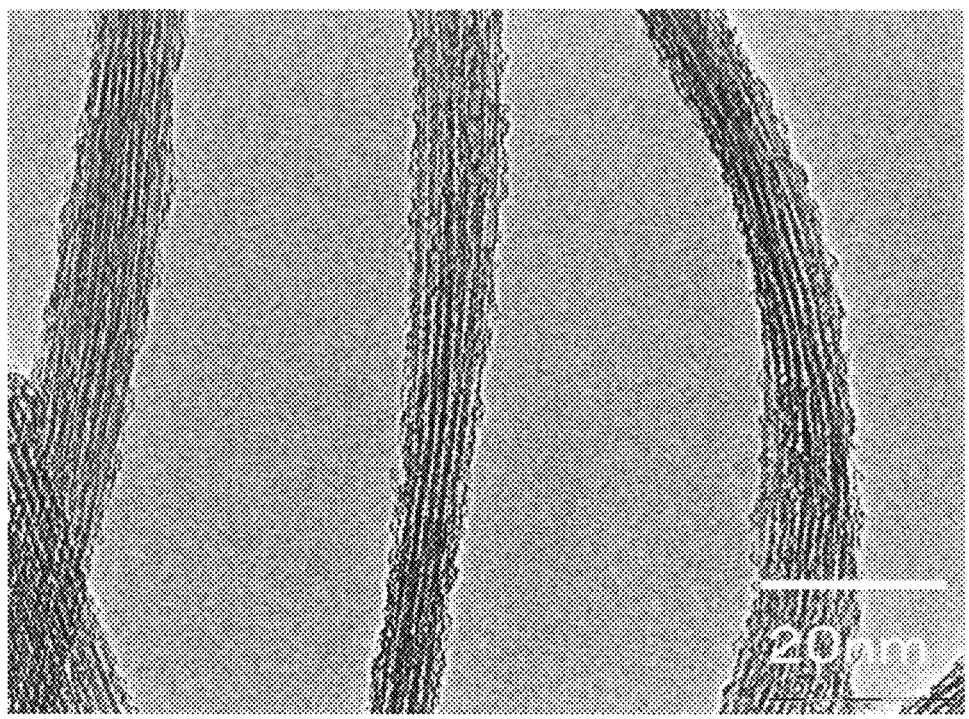
FIG. 3 is a high-resolution transmission electron microscope image of the carbon nanotubes obtained in Example 1.

The aggregate of carbon nanotubes thus obtained was observed by a high-resolution transmission electron microscope, as a result, as shown in FIG. 3, the carbon nanotubes were constituted by beautiful graphite layers, and carbon nanotubes with 2 in the number of layers were observed. Double-walled carbon nanotubes occupied 90% or more of 100 pieces of carbon nanotubes (91 pieces).

(Resonant Raman Spectroscopic Analysis of Aggregate of Carbon Nanotubes)

Figure 4:
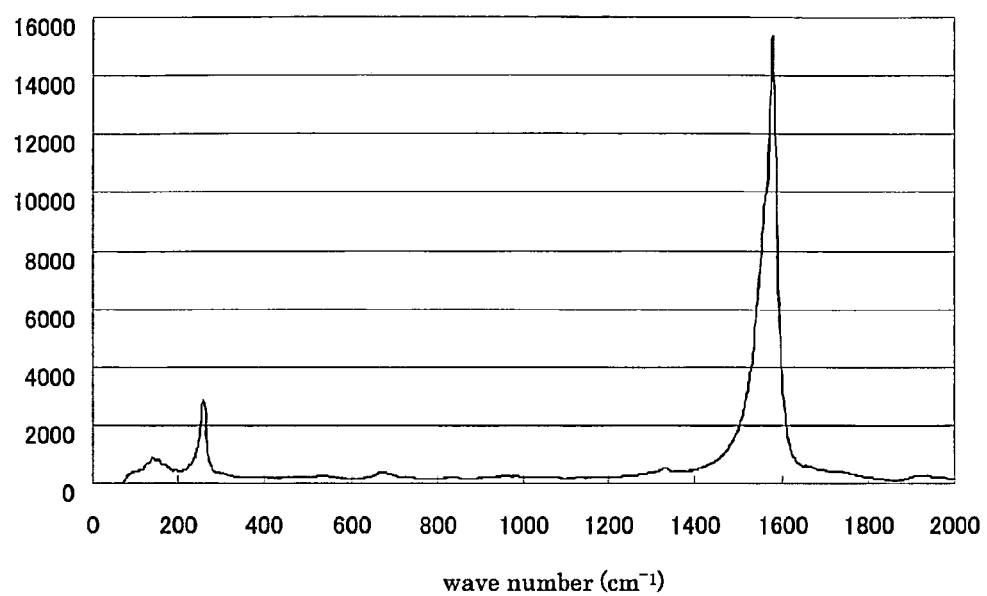
FIG. 4 is a chart of Raman spectroscopic analysis of the carbon nanotubes obtained in Example 1.

The aggregate of carbon nanotubes thus obtained was measured for Raman scattering. As a result, as shown in FIG. 4, in Raman spectroscopic analysis of wavelength 532 nm, peaks were observed at 141 $cm^{-1}$, 155 $cm^{-1}$, 172 $cm^{-1}$, 261 $cm^{-1}$ and 330 $cm^{-1}$, further, in Raman spectroscopic analysis of wavelength 633 nm, a peak was observed at 211 $cm^{-1}$. Additionally, in Raman spectroscopic analysis of wavelength 532 nm, no peak was observed in the region from more than 190 $cm^{-1}$ to less than 260 $cm^{-1}$. It was known that the G/D ratio was 75 (532 nm) showing a high-quality double-walled carbon nanotube of high degree of graphitization.

(Preparation of Dispersion Liquid of Aggregate of Carbon Nanotubes)

In a container of 50 mL, 10 mg of the aggregate of carbon nanotubes and 100 mg of sodium polystyrene sulfonate aqueous solution (manufactured by Sigma-Aldrich Corporation, 30 weight %, weight average molecular weight of 200000) were sampled out, 9.93 mL of distilled water was added thereto, subjected to dispersion treatment under ice cooling for 20 minutes by an ultrasonic homogenizer of output power 25 W, thereby to prepare a dispersion liquid of aggregate of carbon nanotubes. In the liquid prepared, no agglomerated material was confirmed by eye, and the aggregate of carbon nanotubes was well dispersed. The liquid obtained was centrifuged at 20000 G for 15 minutes using a high speed centrifugal machine, and 9 mL of supernatant was sampled. In this time, 1 mL of residual liquid was filtrated using a filter of 1 μm in pore diameter, thereafter, well washed, and the filtration residue obtained was dried at 120° C. by a drier. The weight of the filtration residue was measured to find 3.9 mg. Hence, it was known that 6.1 mg (0.68 mg/mL) of aggregate of carbon nanotubes was dispersed in the supernatant.

Using the dispersion liquid of aggregate of carbon nanotubes thus obtained, a transparent conductive film was obtained by the above-described method. The surface resistance of the transparent conductive film obtained was $1.7 \times 10^3 \Omega/\square$, and the light transmittance was 85% (transparent conductive film 85%/PET film 90.7%=0.94), showing high electrical conductivity and transparency.

Example 2

Supporting Metal Salt on Light Magnesia

A solid catalyst was obtained by doing in the same manner as Example 1.

(Synthesis of Double-Walled Carbon Nanotube)

On nonwoven fabric made of silica/alumina, 8.0 g of the solid catalyst prepared above was placed, and heated at 870° C. A quartz tube of 250 mm inner diameter equipped in a vertical direction inside a vertical reactor was introduced to the central part of a reaction tube of the vertical reactor equipped in the vertical direction of the reactor. Argon gas was supplied at 50 L/min for 5 minutes toward the upper direction of the quartz tube reactor from the bottom of the quartz tube reactor, flowed through a catalyst layer, then, methane gas and argon gas were introduced at 130 mL/min and 3.0 L/min, respectively for 30 minutes and flowed so as to be passed through the catalyst layer, both were contacted and reacted. Introduction of methane gas was stopped, after argon gas alone was flowed at 50 L/min for one minute, a composition containing an aggregate of carbon nanotubes was taken out, and cooled to room temperature. The above-described operation was repeated, the aggregate of carbon nanotubes obtained was provided for the following processes.

Thermal analysis of the aggregate of carbon nanotubes obtained was carried out by the foregoing method. The combustion peak temperature was 510° C.

(Burning of Aggregate of Carbon Nanotubes, Purification Treatment)

30 g of the aggregate of carbon nanotubes was sampled in a porcelain dish (150φ), it was raised to 500° C. over 1 hour under atmosphere in a muffle furnace (FP41 manufactured by Yamato Scientific Co., Ltd.), maintained for 60 minutes to conduct burning treatment, then cooled naturally. Further, to remove the catalyst from the above-described carbon nanotubes, purification treatment was conducted as follows. The carbon nanotubes were added to 6N aqueous hydrochloric acid solution and stirred for one hour at room temperature. A recovered material obtained by filtration using a filter of 1 μm in pore diameter was further added to 6N aqueous hydrochloric acid solution and stirred for one hour at room temperature. This was filtrated using a filter of 1 μm in pore diameter and washed with water several times, then the filtration residue was dried overnight in an oven of 120° C., which removed magnesia and metals, resulting in purification of carbon nanotubes.

(High-Resolution Transmission Electron Microscope Analysis of Aggregate of Carbon Nanotubes)

Figure 5:
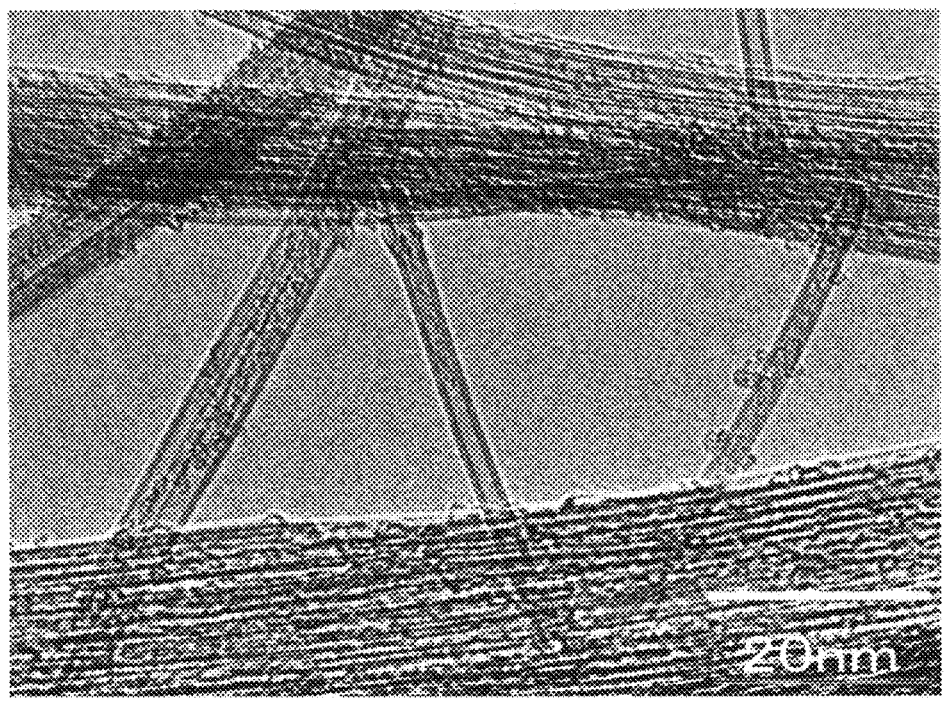
FIG. 5 is a high-resolution transmission electron microscope image of the carbon nanotubes obtained in Example 2.

The aggregate of carbon nanotubes thus obtained was observed by a high-resolution transmission electron microscope, as a result, as shown in FIG. 5, the carbon nanotubes were constituted by beautiful graphite layers, and carbon nanotubes with 2 in the number of layers were observed. Double-walled carbon nanotubes occupied 90% or more of 100 pieces of carbon nanotubes (90 pieces).

(Resonant Raman Spectroscopic Analysis of Aggregate of Carbon Nanotubes)

Figure 6:
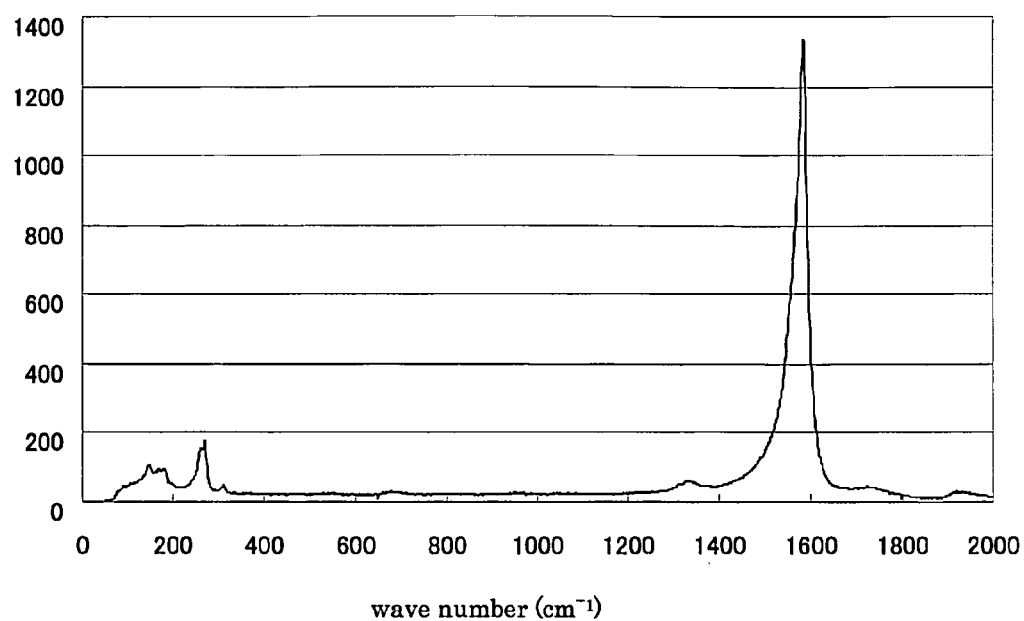
FIG. 6 is a chart of Raman spectroscopic analysis of the carbon nanotubes obtained in Example 2.

The aggregate of carbon nanotubes thus obtained was measured for Raman scattering. As a result, as shown in FIG. 6, in Raman spectroscopic analysis of wavelength 532 nm, peaks were observed at 146 $cm^{-1}$, 165 $cm^{-1}$, 181 $cm^{-1}$, 263 $cm^{-1}$ and 312 $cm^{-1}$ further, in Raman spectroscopic analysis of wavelength 633 nm, a peak was observed at 216 $cm^{-1}$. Additionally, in Raman spectroscopic analysis of wavelength 532 nm, no peak was observed in the region from more than 190 $cm^{-1}$ to less than 260 $cm^{-1}$. It was known that the G/D ratio was 46 (532 nm) showing a high-quality double-walled carbon nanotube of high degree of graphitization.

(Preparation of Dispersion Liquid of Aggregate of Carbon Nanotubes)

Ina container of 50 mL, 10 mg of the above-described aggregate of carbon nanotubes and 100 mg of sodium polystyrene sulfonate aqueous solution (manufactured by Sigma-Aldrich Corporation, 30 weight %, weight average molecular weight of 200000) were weighed out, 9.93 mL of distilled water was added thereto, subjected to dispersion treatment under ice cooling for 20 minutes using an ultrasonic homogenizer of output power 25 W, thereby to prepare a dispersion liquid of aggregate of carbon nanotubes. No agglomerated material in the liquid prepared was confirmed by eye, and the aggregate of carbon nanotubes was well dispersed. The liquid obtained was centrifuged at 20000 G for 15 minutes using a high speed centrifugal machine, and 9 mL of supernatant was sampled. In this time, 1 mL of residual liquid was filtrated using a filter of 1 μm in pore diameter, thereafter, well washed, and the filtration residue obtained was dried at 120° C. by a drier. The weight of the filtration residue was measured to find 1.0 mg. Hence, it was known that 9.0 mg (1.00 mg/mL) of aggregate of carbon nanotubes was dispersed in the supernatant.

Using the dispersion liquid of aggregate of carbon nanotubes thus obtained, a transparent conductive film was obtained by the above-described method. The surface resistance of the transparent conductive film obtained was $1.1 \times 10^3 \Omega/\square$, and the light transmittance was 85% (transparent conductive film 85%/PET film 90.7%=0.94), showing high electrical conductivity and transparency.

Example 3

Production of Field Electron Emission Source

In a beaker of 100 mL, 50 mg of the carbon nanotubes obtained in Example 1 that the catalyst was removed, and 100 mL of acetone were put, and irradiated by ultrasonic waves for 30 minutes, obtaining the dispersion liquid. The present dispersion liquid was put in a beaker in which a copper plate was put, left still for acetone to evaporate naturally, thereby to obtain a copper plate that carbon nanotubes were deposited on the surface.

(Evaluation of Filed Electron Emission Capability)

The copper plate obtained can be used as a cathode of a field emission device. The copper plate that carbon nanotubes were deposited on the surface is used as a cathode electrode, and other copper plate is disposed as an anode electrode facing the above-described cathode electrode. This diode structural object is introduced to a chamber for evaluation, and field electron emission capability can be evaluated. The carbon nanotubes obtained in the present Examples can be expected to show a good field electron emission capability.

Example 4

Supporting Metal Salt on Light Magnesia

A solid catalyst was obtained by doing in the same manner as Example 1.

(Synthesis of Double-Walled Carbon Nanotube)

Carbon nanotubes were synthesized in the vertical reactor shown in FIG. 2. 12 g of catalyst was set on the quartz sintered plate 101 through the catalyst input line 103 from the sealed catalyst feeder 102. Next, supply of argon gas was started from the raw gas supply line 104 at 1000 mL/min. After inside of the reactor was replaced with argon gas atmosphere, temperature was raised to 850° C. by heating (rising temperature time of 30 minutes).

After reaching 850° C., the temperature was kept, flow rate of argon in the raw gas supply line 104 was increased to 2000 mL/min, fluidization of solid catalyst on the quartz sintered plate was started. After fluidization was confirmed through the inspection port 107 of heating furnace, further supply of methane was started at 95 mL/min (methane concentration of 4.5 vol %) to the reactor. After the mixed gas was supplied for 30 minutes, it was changed to the flow of argon gas alone, thereby finishing synthesis.

Heating was stopped, being allowed to stand till room temperature, after reaching room temperature, a composition containing the aggregate of carbon nanotubes and catalyst was taken out from the reactor. The above-described operation was repeated, and the aggregate of carbon nanotubes obtained was provided for the following processes.

Thermal analysis of the aggregate of carbon nanotubes obtained was carried out by the foregoing method. The combustion peak temperature was 510° C.

(Burning of Aggregate of Carbon Nanotubes, Purification Treatment)

30 g of the aggregate of carbon nanotubes was sampled in a porcelain dish (150φ), it was raised to 500° C. over 1 hour under atmosphere in a muffle furnace (FP41 manufactured by Yamato Scientific Co., Ltd.) and maintained for 60 minutes, then cooled naturally. Further, to remove the catalyst from the above-described carbon nanotubes, purification treatment was conducted as follows. The carbon nanotubes were burned at 400° C. for 1 hour under atmosphere, then added to 6N aqueous hydrochloric acid solution and stirred for 2 hours in a water bath of 80° C. A recovered material obtained by filtration was further added to 6N aqueous hydrochloric acid solution and stirred for 1 hour in a water bath of 80° C. This was filtrated and washed with water several times, then the filtration residue was dried overnight in an oven of 120° C., which removed magnesia and metals, resulting in purification of carbon nanotubes.

(High-Resolution Transmission Electron Microscope Analysis of Aggregate of Carbon Nanotubes)

Figure 7:
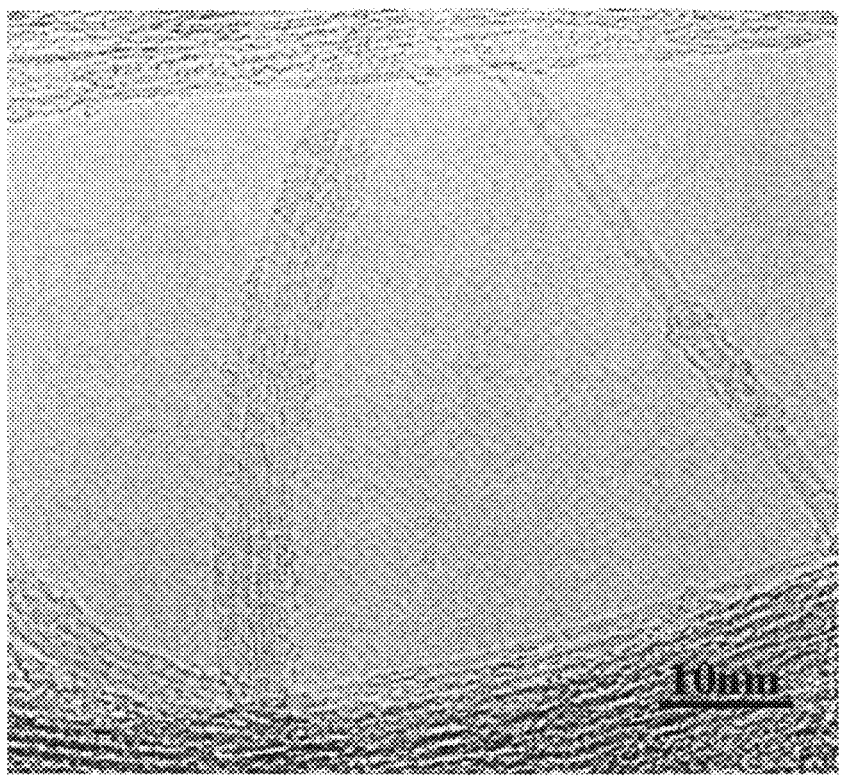
FIG. 7 is a high-resolution transmission electron microscope image of the double-walled carbon nanotubes obtained in Example 4.

The aggregate of carbon nanotubes thus obtained was observed by a high-resolution transmission electron microscope, as a result, as shown in FIG. 7, the carbon nanotubes were constituted by beautiful graphite layers, and carbon nanotubes with 2 in the number of layers were observed. Double-walled carbon nanotubes occupied 80% or more of the total number of carbon nanotubes.

(Resonant Raman Spectroscopic Analysis of Aggregate of Carbon Nanotubes)

Figure 8:
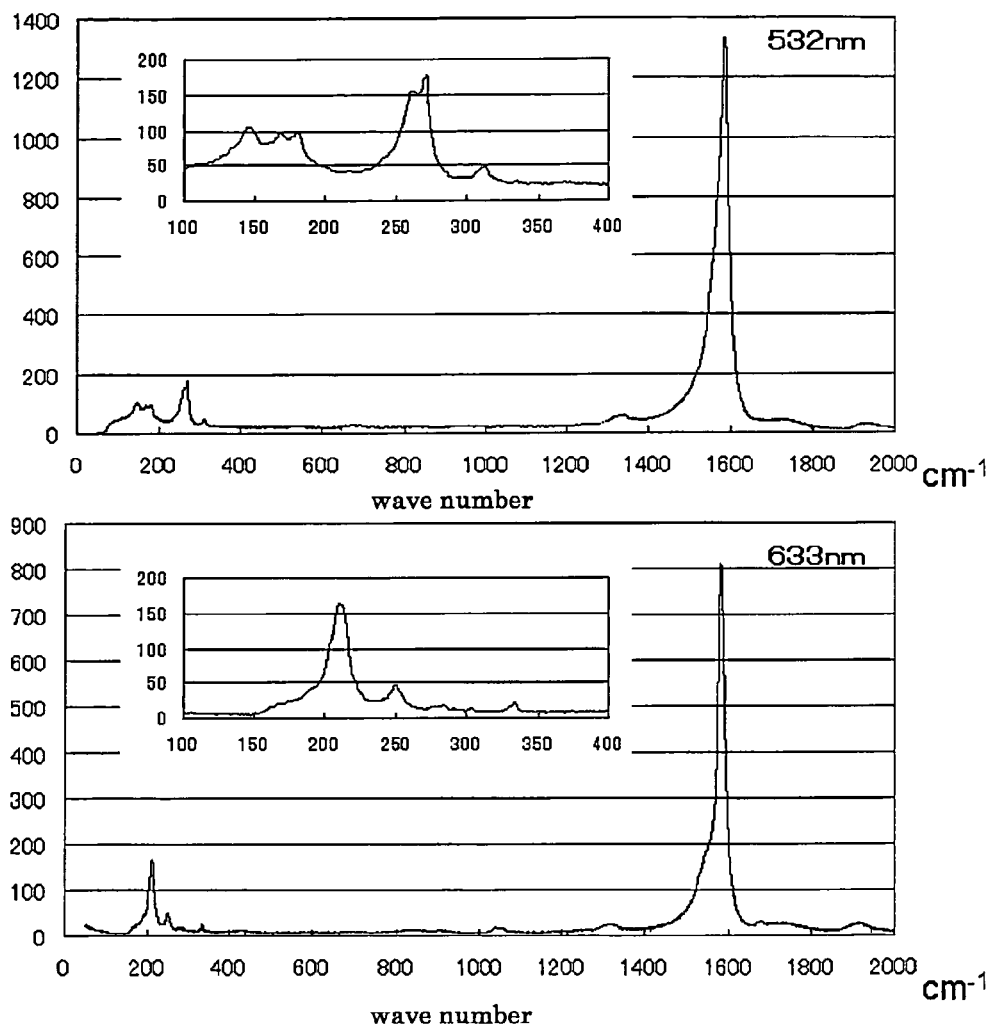
FIG. 8 is charts of Raman spectroscopic analysis of the double-walled carbon nanotubes obtained in Example 5.
Figure 9:
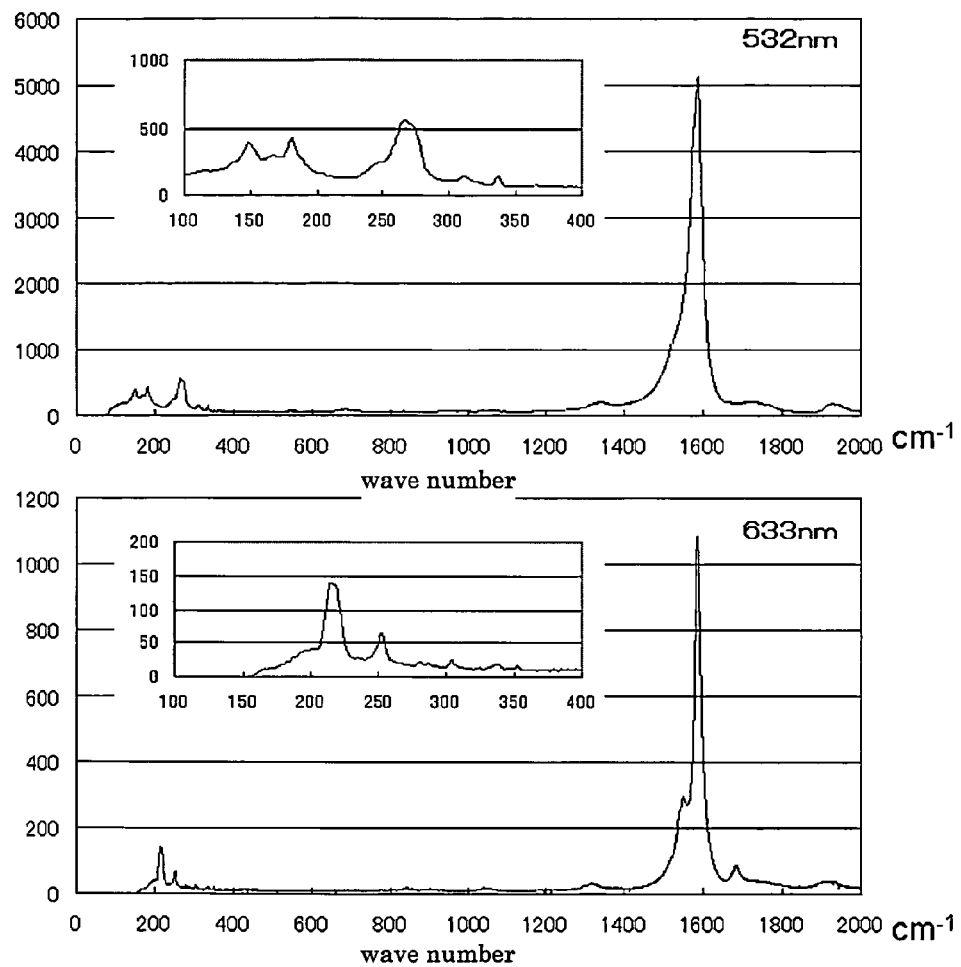
FIG. 9 is charts of Raman spectroscopic analysis of the double-walled carbon nanotubes obtained in Example 6.
Figure 10:
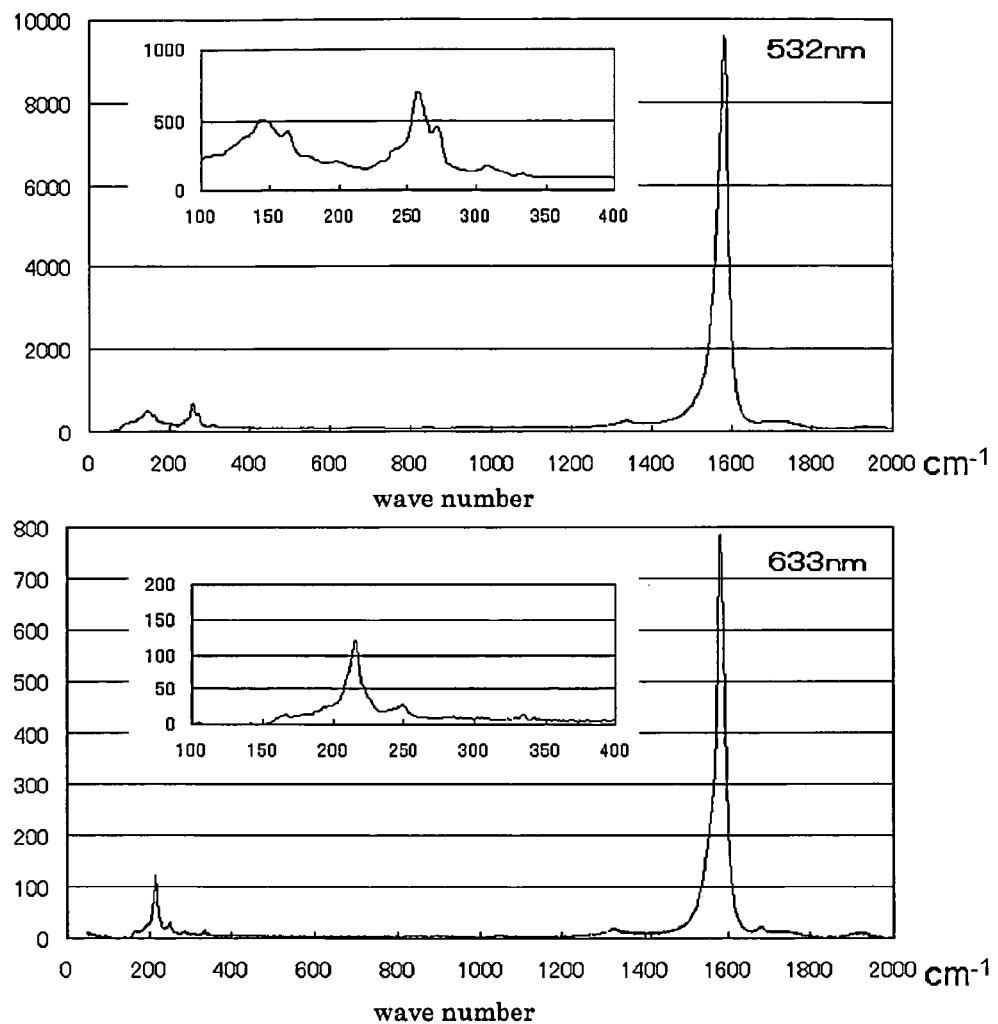
FIG. 10 is charts of Raman spectroscopic analysis of the double-walled carbon nanotubes obtained in Example 7.

The aggregate of carbon nanotubes thus obtained was measured for Raman scattering. As a result, as shown in FIG. 8, in Raman spectroscopic analysis of wavelength 532 nm, peaks were observed Raman spectroscopic analysis of wavelength 633 nm, a peak was observed at 211 $cm^{-1}$. Additionally, in Raman spectroscopic analysis of wavelength 532 nm, no peak was observed in the region from more than 190 $cm^{-1}$ to less than 260 $cm^{-1}$. It was known that the G/D ratio was 49 (532 nm), 49 (633 nm) showing a high-quality double-walled carbon nanotube of high degree of graphitization.

(Preparation of Dispersion Liquid of Carbon Nanotubes)

In a container of 50 mL, 10 mg of the above-described carbon nanotubes and 30 mg of sodium cholate (manufactured by Sigma-Aldrich Corporation) were weighed out, 10 mL of distilled water was added thereto, subjected to dispersion treatment under ice cooling for 20 minutes using an ultrasonic homogenizer of output power 25 W, thereby to prepare a dispersion liquid of carbon nanotubes. No agglomerated material in the liquid prepared was confirmed by eye, and the carbon nanotubes were well dispersed. The liquid obtained was centrifuged at 20000 G for 15 minutes using a high speed centrifugal machine, and supernatant was stored in a 50 ml sample bottle. Carbon nanotubes piled up at the bottom were dried, then burned at 400° C. for 1 hour to burn away an organic component, then the weight was measured to find a result that the amount of carbon nanotubes deposited was 13 weight % relative to the amount of carbon nanotubes originally added.

Using the dispersion liquid of carbon nanotubes thus obtained, a transparent conductive film was obtained by the above-described method. The surface resistance of the transparent conductive film obtained was $5.5 \times 10^3 \Omega/\square$, and the light transmittance was 85% (transparent conductive film 85%/PET film 90.7%=0.94), showing high electrical conductivity and transparency.

Example 5

Synthesis of Dispersant

To a suspension of 2-aminoanisole-4-sulfonic acid (2.0 g) in distilled water (20 mL), triethylamine (1.39 mL) was added to make a solution. Thereafter, a solution of ammonium peroxodisulfate (2.3 g) in distilled water (5 mL) was added to the foregoing solution dropwise over about 10 minutes. After continuously stirring overnight at room temperature, acetone (200 mL) was added to result in producing a precipitate. The precipitate was filtered and washed with acetone (300 mL), then dried overnight in an oven of 120° C., as a result, 2.1 g of poly(2-sulfo-5-methoxy-1,4-iminophenylene) was obtained.

(Preparation of Dispersion Liquid of Carbon Nanotubes)

In a container of 50 mL, 10 mg of carbon nanotubes that the catalyst was removed in the above-described Example 4 and 30 mg of poly(2-sulfo-5-methoxy-1,4-iminophenylene) were weighed out, 10 mL of distilled water was added thereto, subjected to dispersion treatment under ice cooling for 20 minutes using an ultrasonic homogenizer of output power 25 W, thereby to prepare a dispersion liquid of carbon nanotubes. No agglomerated material in the liquid prepared was confirmed by eye, and the carbon nanotubes were well dispersed. The liquid obtained was centrifuged at 20000 G for 15 minutes using a high speed centrifugal machine, and supernatant was stored in a 50 ml sample bottle. Carbon nanotubes piled up at the bottom were dried, then burned at 400° C. for 1 hour to burn away an organic component, then the weight was measured to find a result that the amount of carbon nanotubes deposited was 10 weight % relative to the amount of carbon nanotubes originally added.

Using the dispersion liquid of carbon nanotubes thus obtained, a transparent conductive film was obtained by the above-described method. The surface resistance of the transparent conductive film obtained was $1.0 \times 10^4 \Omega/\square$, and the light transmittance was 88% (transparent conductive film 88%/PET film 90.7%=0.97), showing high electrical conductivity and transparency. Further, the above-described dispersion liquid of carbon nanotubes was coated again on this film, air-dried, rinsed, and subjected to a drying process. As a result, the surface resistance of the transparent conductive film obtained was $4.0 \times 10^3 \Omega/\square$, and the light transmittance was 86% (transparent conductive film 86%/PET film 90.7%=0.95), showing high electrical conductivity and transparency. The same process was done once again, the surface resistance of the transparent conductive film obtained was $2.4 \times 10^3 \Omega/\square$, and the light transmittance was 84% (transparent conductive film 84%/PET film 90.7%=0.93), showing high electrical conductivity and transparency.

Example 6

Hydrogen Peroxide Treatment of Carbon Nanotube 30 g of the aggregate of carbon nanotubes sticking a catalyst synthesized in Example 4 was sampled in a porcelain dish (150φ), it was raised to 400° C. over 1 hour under atmosphere in a muffle furnace (FP41 manufactured by Yamato Scientific Co., Ltd.) and maintained for 60 minutes, then cooled naturally. Further, to remove the catalyst from the above-described carbon nanotubes, purification treatment was conducted as follows. The carbon nanotubes were added to 6N aqueous hydrochloric acid solution and stirred for 2 hours in a water bath of 80° C. A recovered material obtained by filtration was further added to 6N aqueous hydrochloric acid solution and stirred for 1 hour in a water bath of 80° C. This was filtrated and washed with water several times, then the filtration residue was dried overnight in an oven of 120° C., which removed magnesia and iron, resulting in purification of carbon nanotubes. Thereafter, 50 mg of the carbon nanotubes and 50 mL of aqueous 34.5% hydrogen peroxide solution (manufactured by Kanto Chemical Co., Ltd.) were mixed, and reacted at 80° C. for 4 hours. After reaction, it was filtrated, washed with water several times, then filtration residue was dried overnight in an oven of 120° C.

(Resonant Raman Spectroscopic Analysis of Aggregate of Carbon Nanotubes)

The aggregate of carbon nanotubes thus obtained was measured for Raman scattering. As a result, in Raman spectroscopic analysis of wavelength 532 nm, peaks were observed at 149 cm$^{-1}$, 168 cm$^{-1}$, 181 cm$^{-1}$, 268 cm$^{-1}$ and 312 cm$^{-1}$, further, in Raman spectroscopic analysis of wavelength 633 nm, a peak was observed at 216 cm$^{-1}$. Additionally, in Raman spectroscopic analysis of wavelength 532 nm, no peak was observed in the region from more than 190 cm$^{-1}$ to less than 260 cm$^{-1}$. It was known that the G/D ratio was 57 (532 nm), 57 (633 nm) showing a high-quality double-walled carbon nanotube of high degree of graphitization.

(Preparation of Dispersion Liquid of Carbon Nanotubes)

In a container of 50 mL, 10 mg of the above-described carbon nanotubes and 20 mg of poly(2-sulfo-5-methoxy-1,4-iminophenylene) were weighed out, 10 mL of distilled water was added thereto, subjected to dispersion treatment under ice cooling for 30 minutes using an ultrasonic homogenizer of output power 240 W, thereby to prepare a dispersion liquid of carbon nanotubes. No agglomerated material in the liquid prepared was confirmed by eye, and the carbon nanotubes were well dispersed. The liquid obtained was centrifuged at 10000 G for 15 minutes using a high speed centrifugal machine, and supernatant was stored in a 50 ml sample bottle. Carbon nanotubes piled up at the bottom were dried, then burned at 400° C. for 1 hour to burn away an organic component, then the weight was measured to find a result that the amount of carbon nanotubes deposited was 5 weight % relative to the amount of carbon nanotubes originally added.

Using the dispersion liquid of carbon nanotubes thus obtained, a transparent conductive film was obtained by the above-described method. The surface resistance of the transparent conductive film obtained was $3.0 \times 10^3 \Omega/\square$, and the light transmittance was 88% (transparent conductive film 88%/PET film 92.5%=0.95), showing high electrical conductivity and transparency.

Example 7

Mixed Acid Treatment of Carbon Nanotube 30 g of the aggregate of carbon nanotubes sticking a catalyst synthesized in Example 4 was sampled in a porcelain dish (150φ), it was raised to 400° C. over 1 hour under atmosphere in a muffle furnace (FP41 manufactured by Yamato Scientific Co., Ltd.) and maintained for 60 minutes, then cooled naturally. Further, to remove the catalyst from the above-described carbon nanotubes, purification treatment was conducted as follows. The carbon nanotubes were added to 6N aqueous hydrochloric acid solution and stirred for 2 hours in a water bath of 80° C. A recovered material obtained by filtration was further added to 6N aqueous hydrochloric acid solution and stirred for 1 hour in a water bath of 80° C. This was filtrated and washed with water several times, then the filtration residue was dried overnight in an oven of 120° C., which removed magnesia and iron, resulting in purification of carbon nanotubes. Thereafter, in 200 mg of carbon nanotubes, 30 ml of concentrated sulfuric acid (manufactured by Kanto Chemical Co., Ltd.) and 10 ml of concentrated nitric acid (manufactured by Kanto Chemical Co., Ltd.) were mixed, and reacted at 80° C. for 4 hours. After reaction, it was filtrated, washed with water several times, then the filtration residue was dried overnight in an oven of 120° C., obtaining 140 mg of recovered material. Thereafter, to the recovered material, 14 mL of isopropylamine and 126 mL of distilled water were added, and mixed for about 10 minutes by ultrasonic pulse. After that, it was filtrated, washed with water several times, then the filtration residue was dried overnight in an oven of 120° C.

(Resonant Raman Spectroscopic Analysis of Aggregate of Carbon Nanotubes)

The aggregate of carbon nanotubes thus obtained was measured for Raman scattering. As a result, in Raman spectroscopic analysis of wavelength 532 nm, peaks were observed at 149 $cm^{-1}$, 163 $cm^{-1}$, 181 $cm^{-1}$, 260 $cm^{-1}$ and 310 $cm^{-1}$, further, in Raman spectroscopic analysis of wavelength 633 nm, a peak was observed at 217 $cm^{-}$. Additionally, in Raman spectroscopic analysis of wavelength 532 nm, no peak was observed in the region from more than 190 $cm^{-1}$ to less than 260 $cm^{-1}$. It was known that the G/D ratio was 62 (532 nm), 57 (633 nm) showing a high-quality double-walled carbon nanotube of high degree of graphitization.

(Preparation of Dispersion Liquid of Carbon Nanotubes)

In a container of 50 mL, 10 mg of the above-described carbon nanotubes and 20 mg of poly(2-sulfo-5-methoxy-1,4-iminophenylene) were weighed out, 10 mL of distilled water was added thereto, subjected to dispersion treatment under ice cooling for 30 minutes using an ultrasonic homogenizer of output power 240 W, thereby to prepare a dispersion liquid of carbon nanotubes. No agglomerated material in the liquid prepared was confirmed by eye, and the carbon nanotubes were well dispersed. The liquid obtained was centrifuged at 10000 G for 15 minutes using a high speed centrifugal machine, and supernatant was stored in a 50 ml sample bottle. Carbon nanotubes piled up at the bottom were dried, then burned at 400° C. for 1 hour to burn away an organic component, then the weight was measured to find a result that the amount of carbon nanotubes deposited was detection limit (1 weight % or less) of the amount originally added.

Using the dispersion liquid of carbon nanotubes thus obtained, a transparent conductive film was obtained by the above-described method. The surface resistance of the transparent conductive film obtained was $2.5 \times 10^3 \Omega/\square$, and the light transmittance was 87% (transparent conductive film 87%/PET film 92.5%=0.94), showing high electrical conductivity and transparency.

Example 8

Supporting Metal Salt on Light Magnesia 2.46 g of iron ammonium citrate (manufactured by Wako Pure Chemical Industries Ltd.) was dissolved in 50 mL of methanol (manufactured by Kanto Chemical Co., Ltd.). To this solution, 100 g of light magnesia (manufactured by Iwatani International Corporation) was added, and stirred at room temperature for 60 minutes, and dried under reduced pressure while stirring at 40° C. to 60° C. to remove methanol, obtaining a catalytic substance that metal salt was supported on light magnesia powder.

(Synthesis of Double-Walled Carbon Nanotube)

Using the above-described catalyst, carbon nanotubes were synthesized in the same way as Example 1.

Thermal analysis of the aggregate of carbon nanotubes obtained was carried out by the foregoing method. The combustion peak temperature was 456° C.

(Burning of Aggregate of Carbon Nanotubes, Purification Treatment)

30 g of the aggregate of carbon nanotubes was sampled in a porcelain dish (150ϕ), it was raised to 446° C. over 1 hour under atmosphere in a muffle furnace (FP41 manufactured by Yamato Scientific Co., Ltd.) and maintained for 60 minutes, then cooled naturally. Further, to remove the catalyst from the above-described carbon nanotubes, purification treatment was conducted as follows. The carbon nanotubes were added to 6N aqueous hydrochloric acid solution and stirred for 2 hours in a water bath of 80° C. A recovered material obtained by filtration using a filter of 1 μm in pore diameter was further added to 6N aqueous hydrochloric acid solution and stirred for 1 hour in a water bath of 80° C. This was filtrated using a filter of 1 μm in pore diameter and washed with water several times, then the filtration residue was dried overnight in an oven of 120° C., which removed magnesia and metals, resulting in purification of carbon nanotubes.

(High-Resolution Transmission Electron Microscope Analysis of Aggregate of Carbon Nanotubes)

The aggregate of carbon nanotubes thus obtained was observed by a high-resolution transmission electron microscope, as a result, the carbon nanotubes were constituted by beautiful graphite layers, and carbon nanotubes with 2 in the number of layers were observed. Double-walled carbon nanotubes occupied 88% of 100 pieces of carbon nanotubes (88 pieces).

(Resonant Raman Spectroscopic Analysis of Aggregate of Carbon Nanotubes)

The aggregate of carbon nanotubes thus obtained was measured for Raman scattering. As a result, in Raman spectroscopic analysis of wavelength 532 nm, peaks were observed at 138 $cm^{-1}$, 154 $cm^{-1}$, 183 $cm^{-}$, 277 $cm^{-1}$ and 316 $cm^{-1}$, further, in Raman spectroscopic analysis of wavelength 633 nm, a peak was observed at 220 $cm^{-1}$. Additionally, in Raman spectroscopic analysis of wavelength 532 nm, no peak was observed in the region from more than 190 $cm^{-1}$ to less than 260 $cm^{-1}$. It was known that the G/D ratio was 84 (532 nm), 75 (633 nm) showing a high-quality double-walled carbon nanotube of high degree of graphitization.

(Preparation of Dispersion Liquid of Aggregate of Carbon Nanotubes)

In a container of 50 mL, 10 mg of the above-described aggregate of carbon nanotubes and 100 mg of sodium polystyrene sulfonate aqueous solution (manufactured by Sigma-Aldrich Corporation, 30 weight %, weight average molecular weight of 200000) were weighed out, 9.93 mL of distilled water was added thereto, subjected to dispersion treatment under ice cooling for 20 minutes using an ultrasonic homogenizer of output power 25 W, thereby to prepare a dispersion liquid of aggregate of carbon nanotubes. No agglomerated material in the liquid prepared was confirmed by eye, and the aggregate of carbon nanotubes was well dispersed. The liquid obtained was centrifuged at 20000 G for 15 minutes using a high speed centrifugal machine, and 9 mL of supernatant was sampled. In this time, 1 mL of residual liquid was filtrated using a filter of 1 μm in pore diameter, thereafter, well washed, and the filtration residue obtained was dried at 120° C. by a drier. The weight of the filtration residue was measured to find 3.9 mg. Hence, it was known that 6.1 mg (0.68 mg/mL) of aggregate of carbon nanotubes was dispersed in the supernatant.

Using the dispersion liquid of aggregate of carbon nanotubes thus obtained, a transparent conductive film was obtained by the above-described method. The surface resistance of the transparent conductive film obtained was $1.7 \times 10^3 \Omega/\square$, and the light transmittance was 85% (transparent conductive film 85%/PET film 90.7%=0.94), showing high electrical conductivity and transparency.

Comparative Examples 1

Analysis of Carbon Nanotube

Raman G/D ratio (532 nm) of double-walled carbon nanotubes manufactured by Nanotechport Company (diameter<5 nm, length 5 to 15 μm, purity≥90%, ash content<2 wt %, specific surface area>400 m²/g, amorphous carbon<5%) was 14.

(Preparation of Dispersion Liquid of Carbon Nanotubes)

In a container of 50 mL, 10 mg of double-walled carbon nanotubes manufactured by Nanotechport Company and 100 mg of sodium polystyrene sulfonate aqueous solution (manufactured by Sigma-Aldrich Corporation, 30 weight %, weight average molecular weight of 200000) were weighed out, 9.93 mL of distilled water was added thereto, subjected to dispersion treatment under ice cooling for 20 minutes using an ultrasonic homogenizer of output power 25 W, thereby to prepare a dispersion liquid of aggregate of carbon nanotubes. The liquid obtained was centrifuged at 20000 G for 15 minutes using a high speed centrifugal machine, and 9 mL of supernatant was sampled. In this time, the deposit in the residual liquid was filtrated using a filter of 1 μm in pore diameter, washed with water, dried and the weight was measured to find 8.1 mg. Hence, it was known that 1.9 mg (0.21 mg/mL) of carbon nanotubes was dispersed in the supernatant.

Using the dispersion liquid of carbon nanotubes thus obtained, a transparent conductive film was obtained by the above-described method. The surface resistance of the transparent conductive film obtained was $2.8 \times 10^9 \Omega/\square$, and the light transmittance was 90.4% (transparent conductive film 90.4%/PET film 90.7%=0.99).

For the film that carbon nanotubes were fixed in the same way as described above, further the above coating operation was repeated two times in total. The surface resistance of the transparent conductive film obtained was $1.0 \times 10^7 \Omega/\square$, and the light transmittance was 85% (transparent conductive film 85%/PET film 90.7%=0.94).

Comparative Examples 2

Analysis of Carbon Nanotube

Raman G/D ratio (532 nm) of double-walled carbon nanotubes manufactured by Nanocyl Company (batch No. LDW-P90/050517) was 9.

(Preparation of Dispersion Liquid of Carbon Nanotubes)

In a container of 50 mL, 10 mg of double-walled carbon nanotubes manufactured by Nanocyl Company and 100 mg of sodium polystyrene sulfonate aqueous solution (manufactured by Sigma-Aldrich Corporation, 30 weight %, weight average molecular weight of 200000) were weighed out, 9.93 mL of distilled water was added thereto, subjected to dispersion treatment under ice cooling for 20 minutes using an ultrasonic homogenizer of output power 25 W, thereby to prepare a dispersion liquid of aggregate of carbon nanotubes. The liquid obtained was centrifuged at 20000 G for 15 minutes using a high speed centrifugal machine, and 9 mL of supernatant was sampled. In this time, the deposit in the residual liquid was filtrated using a filter of 1 μm in pore diameter, washed with water, dried and the weight was measured to find 8.3 mg. Hence, it was known that 1.7 mg (0.19 mg/mL) of carbon nanotubes was dispersed in the supernatant.

Using the dispersion liquid of carbon nanotubes thus obtained, a transparent conductive film was obtained by the above-described method. The surface resistance of the transparent conductive film obtained was $7.8 \times 10^6 \Omega/\square$, and the light transmittance was 90.1% (transparent conductive film 90.1%/PET film 90.7%=0.99).

For the film that carbon nanotubes were fixed in the same way as described above, further the above coating operation was repeated three times in total. The surface resistance of the transparent conductive film obtained was $1.0 \times 10^6 \Omega/\square$, and the light transmittance was 85% (transparent conductive film 85%/PET film 90.7%=0.94).

Comparative Examples 3

Analysis of Carbon Nanotube

Raman G/D ratio (532 nm) of single-walled carbon nanotubes manufactured by Nanotechport Company (diameter<2 nm, length 5 to 15 μm, purity≥90%, ash content<2 wt %, specific surface area>600 m²/g, amorphous carbon<5%) was 4.

(Preparation of Dispersion Liquid of Carbon Nanotubes)

In a container of 50 mL, 10 mg of single-walled carbon nanotubes manufactured by Nanotechport Company and 100 mg of sodium polystyrene sulfonate aqueous solution (manufactured by Sigma-Aldrich Corporation, 30 weight %, weight average molecular weight of 200000) were weighed out, 9.93 mL of distilled water was added thereto, subjected to dispersion treatment under ice cooling for 20 minutes using an ultrasonic homogenizer of output power 25 W, thereby to prepare a dispersion liquid of aggregate of carbon nanotubes. The liquid obtained was centrifuged at 20000 G for 15 minutes using a high speed centrifugal machine, and 9 mL of supernatant was sampled. In this time, the deposit in the residual liquid was filtrated using a filter of 1 μm in pore diameter, washed with water, dried and the weight was measured to find 8.0 mg. Hence, it was known that 2.0 mg (0.22 mg/mL) of carbon nanotubes was dispersed in the supernatant.

Using the dispersion liquid of carbon nanotubes thus obtained, a transparent conductive film was obtained by the above-described method. Further the same operation was repeated, and coating of the dispersion liquid of carbon nanotubes was conducted three times in total. The surface resistance of the transparent conductive film obtained was $1.0 \times 10^5 \Omega/\square$, and the light transmittance was 85% (transparent conductive film 85%/PET film 90.7%=0.94).

Comparative Examples 4

Analysis of Carbon Nanotube

Raman G/D ratio (532 nm) of single-walled carbon nanotubes manufactured by Nanocyl Company (batch No. LSW-P90/040406) was 8.

(Preparation of Dispersion Liquid of Carbon Nanotubes)

In a container of 50 mL, 10 mg of single-walled carbon nanotubes manufactured by Nanocyl Company and 100 mg of sodium polystyrene sulfonate aqueous solution (manufactured by Sigma-Aldrich Corporation, 30 weight %, weight average molecular weight of 200000) were weighed out, 9.93 mL of distilled water was added thereto, subjected to dispersion treatment under ice cooling for 20 minutes using an ultrasonic homogenizer of output power 25 W, thereby to prepare a dispersion liquid of aggregate of carbon nanotubes. The liquid obtained was centrifuged at 20000 G for 15 minutes using a high speed centrifugal machine, and 9 mL of supernatant was sampled. In this time, the deposit in the residual liquid was filtrated using a filter of 1 μm in pore diameter, washed with water, dried and the weight was measured to find 8.1 mg. Hence, it was known that 1.9 mg (0.21 mg/mL) of carbon nanotubes was dispersed in the supernatant.

Using the dispersion liquid of carbon nanotubes thus obtained, a transparent conductive film was obtained by the above-described method. Further the same operation was repeated, and coating of the dispersion liquid of carbon nanotubes was conducted three times in total. The surface resistance of the transparent conductive film obtained was 4.7× $10^7 \Omega/\square$, and the light transmittance was 85% (transparent conductive film 85%/PET film 90.7%=0.94).

Comparative Examples 5

Analysis of Carbon Nanotube

Raman G/D (532 nm) of multi-walled carbon nanotube manufactured by Bayer Corporation (Baytube, MIV-05-182) was 0.7.

(Preparation of Dispersion Liquid of Carbon Nanotubes)

In a container of 50 mL, 10 mg of multi-walled carbon nanotubes manufactured by Bayer Corporation and 100 mg of sodium polystyrene sulfonate aqueous solution (manufactured by Sigma-Aldrich Corporation, 30 weight %, weight average molecular weight of 200000) were weighed out, 9.93 mL of distilled water was added thereto, subjected to dispersion treatment under ice cooling for 20 minutes using an ultrasonic homogenizer of output power 25 W, thereby to prepare a dispersion liquid of aggregate of carbon nanotubes. The liquid obtained was centrifuged at 20000 G for 15 minutes using a high speed centrifugal machine, and 9 mL of supernatant was sampled. In this time, the deposit in the residual liquid was filtrated using a filter of 1 μm in pore diameter, washed with water, dried and the weight was measured to find 6.3 mg. Hence, it was known that 3.7 mg (0.41 mg/mL) of carbon nanotubes was dispersed in the supernatant.

Using the dispersion liquid of carbon nanotubes thus obtained, a transparent conductive film was obtained by the above-described method. The surface resistance of the transparent conductive film obtained was >1.0× $10^{12} \Omega/\square$, and the light transmittance was 85% (transparent conductive film 85%/PET film 90.7%=0.94).

Comparative Examples 6

The same operation as Example 4 was conducted till the synthesis of carbon nanotubes.

(Resonant Raman Spectroscopic Analysis of Aggregate of Carbon Nanotubes)

Figure 11:
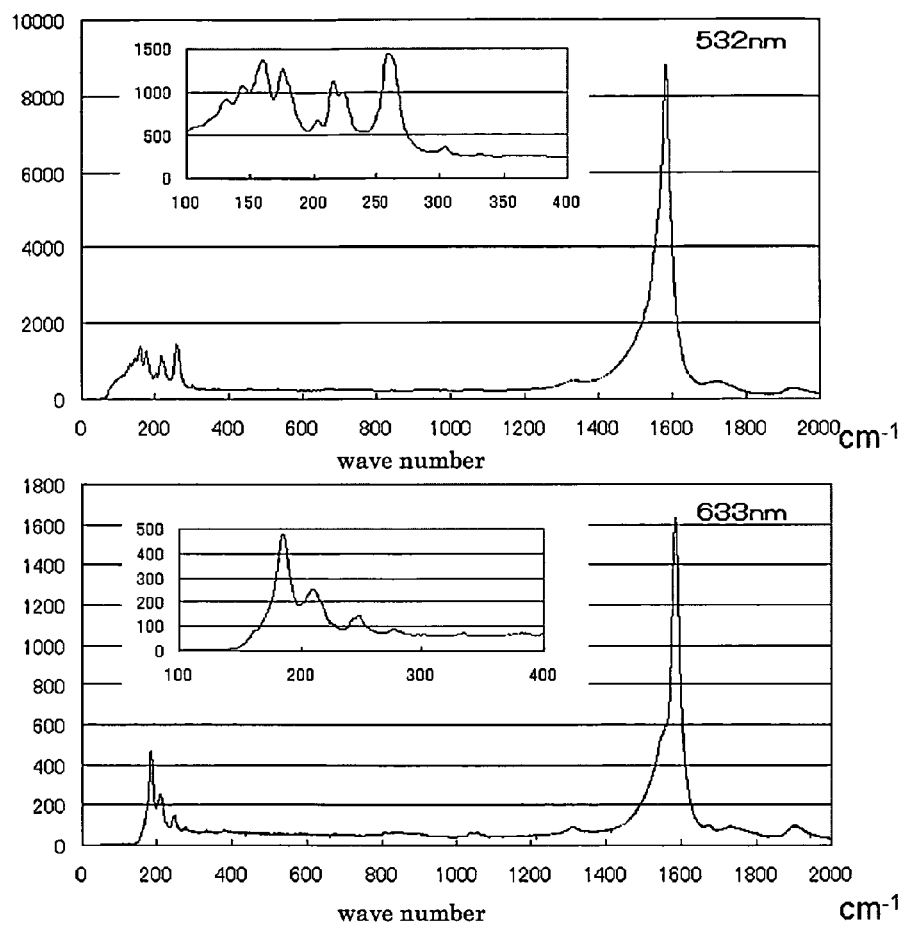
FIG. 11 is charts of Raman spectroscopic analysis of the mixture of single-walled carbon nanotubes and double-walled carbon nanotubes used in Comparative Example 6.
Figure 12:
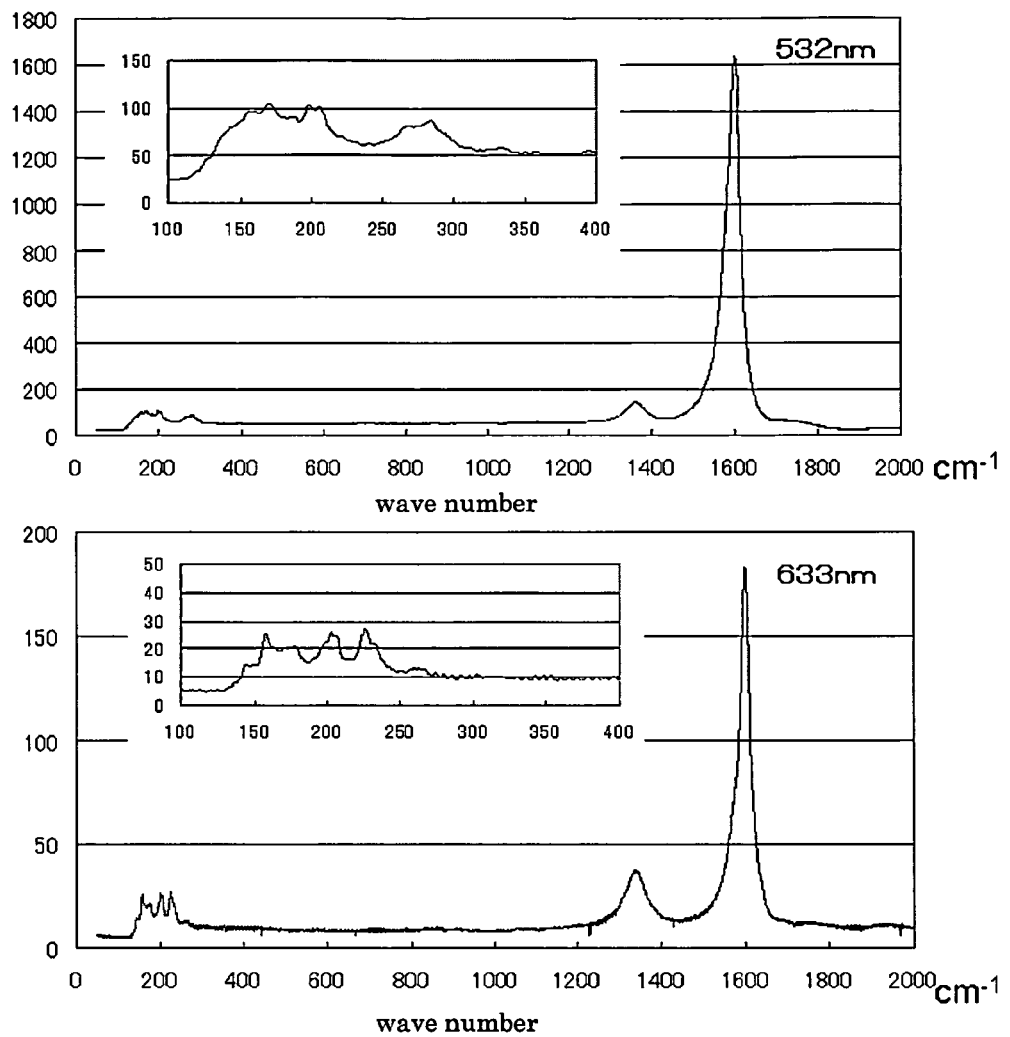
FIG. 12 is charts of Raman spectroscopic analysis of the single-walled carbon nanotubes used in Comparative Example 7.
Figure 13:
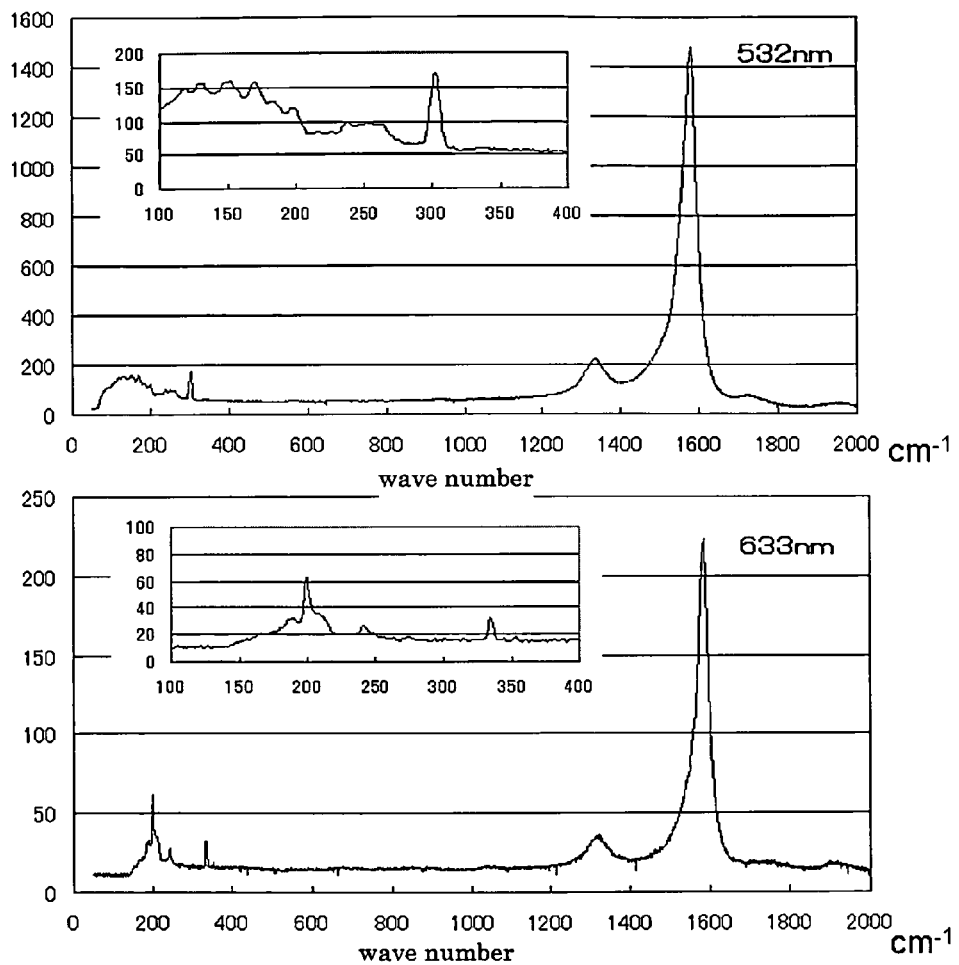
FIG. 13 is charts of Raman spectroscopic analysis of the double-walled carbon nanotubes used in Comparative Example 8.
Figure 14:
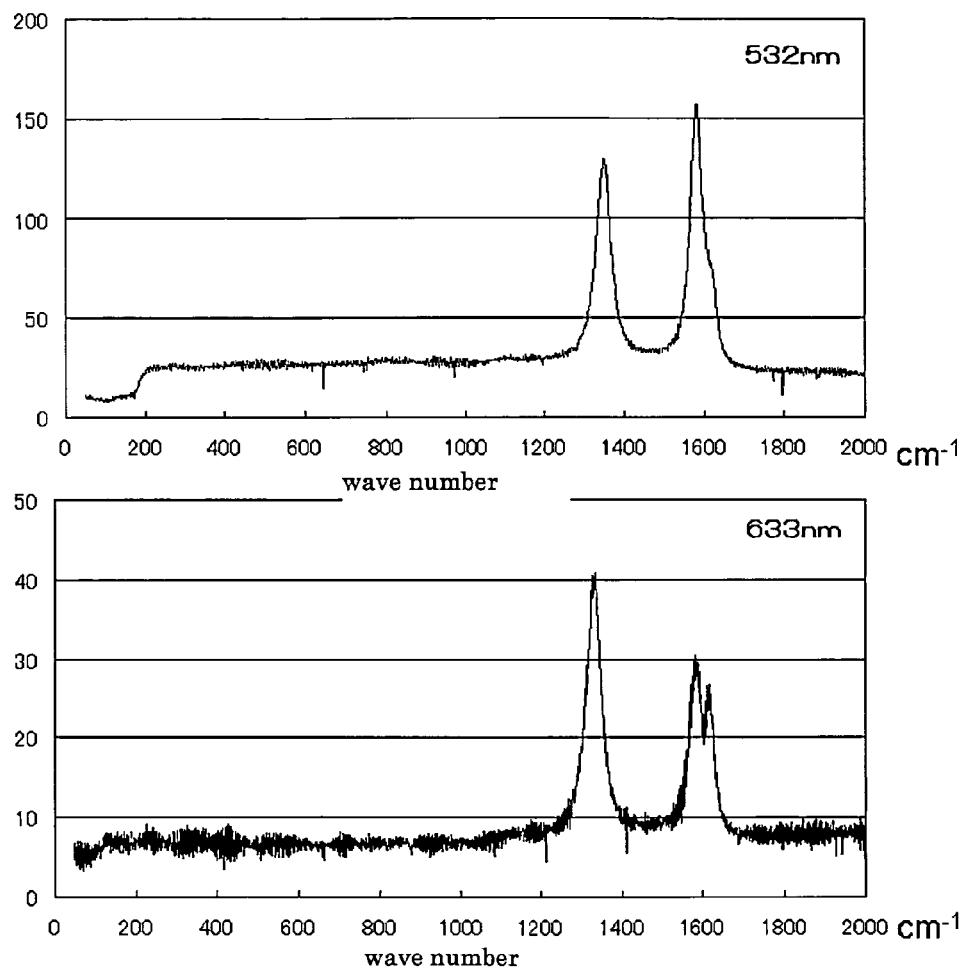
FIG. 14 is charts of Raman spectroscopic analysis of the multi-walled carbon nanotubes used in Comparative Example 9.

The aggregate of carbon nanotubes thus obtained was measured for Raman scattering. As a result, as shown in FIG. 11, in Raman spectroscopic analysis of wavelength 532 nm, peaks were observed at 147 $cm^{-1}$, 170 $cm^{-1}$, 181 $cm^{-1}$, 217 $cm^{-1}$, 271 $cm^{-1}$ and 312 $cm^{-1}$, further, in Raman spectroscopic analysis of wavelength 633 nm, peaks were observed at 186 $cm^{-1}$ and 210 $cm^{-1}$. A peak of 217 $cm^{-1}$ that was not observed in Raman spectroscopic analysis of wavelength 532 nm in Examples 4 to 7 was observed. This is a peak derived from the diameter of single-walled carbon nanotube, and it was known to be a mixture of single-walled carbon nanotubes and double-walled carbon nanotubes including a substantial amount of single-walled carbon nanotubes.

(Preparation of Dispersion Liquid of Carbon Nanotubes)

In a container of 50 mL, 10 mg of the above-described carbon nanotubes that the catalyst was removed, and 30 mg of poly(2-sulfo-5-methoxy-1,4-iminophenylene) were weighed out, 10 mL of distilled water was added thereto, subjected to dispersion treatment under ice cooling for 20 minutes using an ultrasonic homogenizer of output power 25 W, thereby to prepare a dispersion liquid of carbon nanotubes. No agglomerated material in the liquid prepared was confirmed by eye, and the carbon nanotubes were well dispersed. The liquid obtained was centrifuged at 20000 G for 15 minutes using a high speed centrifugal machine, and supernatant was stored in a 50 ml sample bottle. Carbon nanotubes piled up at the bottom were dried, then burned at 400° C. for 1 hour, and the weight was measured to find a result that the amount of carbon nanotubes deposited was 22 weight % relative to that of carbon nanotubes contained in the whole liquid.

Using the dispersion liquid of carbon nanotubes thus obtained, a transparent conductive film was obtained by the above-described method. The surface resistance of the transparent conductive film obtained was 1.0× $10^6 \Omega/\square$, and the light transmittance was 86% (transparent conductive film 86%/PET film 90.7%=0.95). The transparent electrical conductivity thereof was inferior relative to those of Examples.

Comparative Examples 7

Raman Spectroscopic Analysis of Single-Walled Carbon Nanotube

Raman scanning was measured for single-walled carbon nanotubes (manufactured by Nanotechport Company, diameter<5 nm, length 5 to 15 μm, purity≥50%, ash content<2 wt %, specific surface area>400 $m^2$/g, amorphous carbon<5%). As a result, in Raman spectroscopic analysis of wavelength 532 nm, peaks were observed at 172 $cm^{-1}$, 199 $cm^{-1}$, 207 $cm^{-1}$, 268 $cm^{-1}$ and 284 $cm^{-1}$, further, in Raman spectroscopic analysis of wavelength 633 nm, peaks were observed at 159 $cm^{-1}$, 177 $cm^{-1}$, 202 $cm^{-1}$ and 227 $cm^{-1}$. It was known that the G/D ratio was 15 (532 nm), 6 (633 nm) showing a single-walled carbon nanotube of low degree of graphitization.

(Preparation of Liquid Including Single-Walled Carbon Nanotube)

In a container of 50 mL, 60 mg of single-walled carbon nanotubes (manufactured by Nanotechport Company) and 60 mg of polyoxyethylene phenyl ether (manufactured by ICN Corporation) were weighed out, 30 mL of distilled water was added thereto, and treated for 30 minutes using an ultrasonic homogenizer of output power 240 W. The liquid prepared was poor in dispersibility because an agglomerated material was confirmed at the bottom. The liquid obtained was centrifuged at 20000 G for 15 minutes using a high speed centrifugal machine, and supernatant was stored in a 50 ml sample bottle. Carbon nanotubes piled up at the bottom were dried, then burned at 400° C. for 1 hour to burn away an organic component, then the weight was measured to find a result that the amount of carbon nanotubes deposited was 10 weight % relative to that of carbon nanotubes added to the liquid.

Using the dispersion liquid of carbon nanotubes thus obtained, a transparent conductive film was obtained by the above-described method. The coated film obtained was immersed in an acetonitrile solution, after 10 seconds, taken out and dried, thereby further removing the surfactant. The surface resistance of the transparent conductive film obtained was $1.3 \times 10^5 \Omega/\square$, and the light transmittance was 74% (transparent conductive film 74%/PET film 91.3%=0.81).

Comparative Examples 8

Raman Spectroscopic Analysis of Double-Walled Carbon Nanotube)

Raman scanning was measured for double-walled carbon nanotubes (batch No. 060803 manufactured by Nanocyl Company). As a result, in Raman spectroscopic analysis of wavelength 532 nm, peaks were observed at 133 cm$^{-1}$, 152 cm$^{-1}$, 172 cm$^{-1}$, 184 cm$^{-1}$, 199 cm$^{-1}$, 239 cm$^{-1}$ and 303 cm$^{-1}$, further, in Raman spectroscopic analysis of wavelength 633 nm, peaks were observed at 200 cm$^{-1}$ and 334 cm$^{-1}$. It was known that the G/D ratio was 5 (532 nm), 11 (633 nm) showing a double-walled carbon nanotube of low degree of graphitization.

(Preparation of Liquid Including Double-Walled Carbon Nanotube)

In a container of 50 mL, 60 mg of double-walled carbon nanotubes (manufactured by Nanocyl Company) and 120 mg of poly(2-sulfo-5-methoxy-1,4-iminophenylene) were weighed out, 30 mL of distilled water was added thereto, and treated for 30 minutes using an ultrasonic homogenizer of output power 240 W. The liquid prepared was poor in dispersibility since an agglomerated material was confirmed at the bottom. The liquid obtained was centrifuged at 10000 G for 15 minutes using a high speed centrifugal machine, and supernatant was stored in a 50 ml sample bottle. Carbon nanotubes piled up at the bottom were dried, then burned at 400° C. for 1 hour, and the weight was measured to find a result that the amount of carbon nanotubes deposited was 50 weight % relative to that of carbon nanotubes contained in the whole liquid.

Using the dispersion liquid of carbon nanotubes thus obtained, a transparent conductive film was obtained by the above-described method. The coated film obtained was immersed in an acetonitrile solution, after 10 seconds, taken out and dried, thereby further removing the surfactant. The surface resistance of the transparent conductive film obtained was $1.4 \times 10^7 \Omega/\square$, and the light transmittance was 92% (transparent conductive film 92%/PET film 92.5%=0.99).

Comparative Examples 9

Raman Spectroscopic Analysis of Multi-Walled Carbon Nanotube

Raman scanning was measured for multi-walled carbon nanotubes (manufactured by Carbon Nanotube Corporation, diameter 10 to 40 nm, length 5 to 20 μm, purity≥93%). As a result, no peak was observed in RBM region at either wavelength 532 nm or 633 nm. It was known that the G/D ratio was 1 (532 nm), 0.7 (633 nm) showing a multi-walled carbon nanotube of low degree of graphitization.

(Preparation of Liquid Including Multi-Walled Carbon Nanotube)

In a container of 50 mL, 60 mg of multi-walled carbon nanotubes (manufactured by Carbon Nanotube Corporation) and 60 mg of polyoxyethylene phenyl ether (manufactured by ICN Corporation) were weighed out, 30 mL of distilled water was added thereto, and treated for 30 minutes using an ultrasonic homogenizer of output power 240 W. The liquid obtained was centrifuged at 20000 G for 15 minutes using a high speed centrifugal machine, and the resultant supernatant was stored in a 50 ml sample bottle. From that, 5 mL was sampled and weighed, then the liquid was dried and burned at 400° C. for 1 hour. The concentration of carbon nanotubes in the liquid calculated by dividing the weight measured after burning by the weight before burning was 0.15 weight %. The liquid was allowed to stand at room temperature for one day, supernatant was removed by decantation, and carbon nanotubes piled up at the bottom was dried, and burned at 400° C. for 1 hour to burn away an organic component, then the weight was measured to find a result that the amount of carbon nanotubes deposited was 3 weight % relative to that of carbon nanotubes added to the liquid.

Using the dispersion liquid of carbon nanotubes thus obtained, a transparent conductive film was obtained by the above-described method. The coated film obtained was immersed in an acetonitrile solution, after 10 seconds, taken out and dried, thereby further removing the surfactant. The surface resistance of the transparent conductive film obtained was $2 \times 10^5 \Omega/\square$, and the light transmittance was 77% (transparent conductive film 77%/PET film 91.3%=0.84).

Comparative Examples 10

Supporting Metal Salt on Light Magnesia 0.5 g of iron ammonium citrate (manufactured by Wako Pure Chemical Industries Ltd.) was dissolved in 25 mL of methanol (manufactured by Kanto Chemical Co., Ltd.). To this solution, 5 g of light magnesia (manufactured by Wako Pure Chemical Industries Ltd.) was added, and treated for 60 minutes by an ultrasonic cleaner, and methanol was removed by drying while stirring at 40° C. to 60° C., thereby to obtain a solid catalyst that metal salt was supported on light magnesia powder. The bulk density of the catalyst obtained was 0.61 g/mL.

(Synthesis of carbon nanotubes) On quartz wool in the center part of a vertical quartz tube of 64 mm in inner diameter, 1.0 g of the solid catalyst thus prepared was placed, and the center temperature was raised to 900° C. over 120 minutes. After reaching 900° C., methane gas and nitrogen gas were supplied at 18 mL/min and 376 mL/min, respectively (methane concentration 4.7 vol %) for 60 minutes under the condition of reaction pressure $1 \times 10^5$ Pa (one atmospheric pressure), then supply of methane gas was stopped, the temperature was cooled to room temperature under nitrogen flow, and a composition containing the catalyst and aggregate of carbon nanotubes was taken out. The linear velocity of methane under this reaction condition is $9.4 \times 10^{-3}$ cm/sec. The aggregate of carbon nanotubes obtained in this manner was measured by a resonant Raman spectrometer (633 nm). As a result, it was known to be a carbon nanotube with a G/D ratio of 20.

(Purification of Carbon Nanotube)

Further, to remove the catalyst from the above-described carbon nanotubes, purification treatment was conducted as follows. The carbon nanotubes were burned at 400° C. in air for 1 hour, then added to 6N aqueous hydrochloric acid solution and stirred for 2 hours in a water bath of 80° C. A recovered material obtained by filtration was further added to 6N aqueous hydrochloric acid solution and stirred for 1 hour in a water bath of 80° C. This was filtrated and washed with water several times, then the filtration residue was dried overnight in an oven of 120° C., which removed magnesia and metals, resulting in purification of carbon nanotubes.

(Preparation of Dispersion Liquid of Carbon Nanotubes)

In a container of 50 mL, 10 mg of the above-described a carbon nanotubes and 100 mg of sodium polystyrene sulfonate aqueous solution (manufactured by Sigma-Aldrich Corporation, 30 weight %, weight average molecular weight of 200000) were weighed out, 9.93 mL of distilled water was added thereto, subjected to dispersion treatment under ice cooling for 20 minutes using an ultrasonic homogenizer of output power 25 W, thereby to prepare a dispersion liquid of aggregate of carbon nanotubes. The liquid obtained was centrifuged at 20000 G for 15 minutes using a high speed centrifugal machine, and 9 mL of supernatant was sampled. In this time, the deposit in the residual liquid was filtrated using a filter of 1 in pore diameter, washed with water, dried, and the weight was measured to find 7.3 mg. Hence, it was known that 2.7 mg (0.30 mg/mL) of carbon nanotubes was dispersed in the supernatant.

Using the dispersion liquid of carbon nanotubes thus obtained, a transparent conductive film was obtained by the above-described method. The surface resistance of the transparent conductive film obtained was $6.0 \times 10^4 \Omega/\square$, and the light transmittance was 85.0% (transparent conductive film 85.0%/PET film 90.7%=0.94).

TABLE 1

| | Raman G/D ratio | Supernatant concentration (mg/mL) | Transparent electrical conductivity (surface resistance at 85% light transmittance) |
|---|---|---|---|
| Example 1 | 75 | 0.68 | $1.7 \times 10^3 \Omega/\square$ |
| Example 2 | 46 | 1.00 | $1.1 \times 10^3 \Omega/\square$ |
| Comparative Example 1 | 14 | 0.21 | $1.0 \times 10^7 \Omega/\square$ |
| Comparative Example 2 | 9 | 0.19 | $1.0 \times 10^6 \Omega/\square$ |
| Comparative Example 3 | 4 | 0.22 | $1.0 \times 10^5 \Omega/\square$ |
| Comparative Example 4 | 8 | 0.21 | $4.7 \times 10^7 \Omega/\square$ |
| Comparative Example 5 | 0.7 | 0.41 | $>1.0 \times 10^{12} \Omega/\square$ |

INDUSTRIAL APPLICABILITY

The aggregate of carbon nanotubes of the present invention is useful as a field emission material. For example, when the aggregate of carbon nanotubes of the present invention is used as an electron source of a field emission, applied voltage can be kept low because the diameter is small and concentration of charge tends to take place. Due to high-quality multi-walled, particularly, double-walled carbon nanotubes, it can be estimated that durability is also good. Owing to such aggregate of carbon nanotubes, it is thought to be used as a good emission material.

The invention claimed is:

1. An aggregate of carbon nanotubes, wherein, at least 50 of 100 carbon nanotubes randomly selected from the aggregate of carbon nanotubes are double-walled carbon nanotubes when observed by a transmission microscope, a height ratio (G/D ratio) of G band to D band b Raman spectroscopic analysis of wavelength 532 nm of the aggregate of carbon nanotubes is 30 or more, and when a mixture of 10 mg of the aggregate of carbon nanotubes, 30 mg of sodium polystyrene sulfonate and 10 mL of water is subjected to ultrasonic homogenizer treatment, subsequently subjected to centrifugal treatment at 20000 G, and then 9 mL of supernatant is sampled, the content of the aggregate of carbon nanotubes in the supernatant is 0.6 mg/mL or more.

2. The aggregate of carbon nanotubes of claim 1, wherein the aggregate of carbon nanotubes is used as a dispersion liquid, light transmittance of a film obtained by coating the dispersion liquid on a substrate is 85% or more, and surface resistance of the film is less than $1 \times 10^5 \Omega/\square$.

3. The aggregate of carbon nanotubes of claim 1, wherein at least 70 of 100 carbon nanotubes randomly selected from the aggregate of carbon nanotubes are double-walled carbon nanotubes when observed by a transmission microscope.

4. A dispersion wherein the aggregate of carbon nanotubes of claim 1 is dispersed in a dispersion media.

5. The dispersion of an aggregate of carbon nanotubes of claim 4, further containing a surfactant or a polymer.

6. The dispersion of an aggregate of carbon nanotubes of claim 4, wherein the concentration of aggregate of carbon nanotubes is from 0.01 weight % to 20 weight %.

7. A conductive film wherein an aggregate of carbon nanotubes of claim 1 is coated on a substrate, and the light transmittance is 85% or more and the surface resistance is less than $1 \times 10^5 \Omega/\square$.

8. The conductive film of claim 7, wherein transmittance of the conductive film/light transmittance of a transparent substrate is >0.85.

9. The conductive film of claim 7, wherein the surface resistance is less than $1 \times 10^4 \Omega/\square$.

10. A method for producing the aggregate of carbon nanotubes of claim 1, wherein a powdery catalyst supporting iron on magnesia is disposed in a vertical reactor over the whole area in a horizontal cross section direction of the reactor, methane is flowed in a vertical direction inside the vertical reactor, methane and said catalyst are contacted at 500 to 1200° C. to synthesize an aggregate of carbon nanotubes, thereafter, oxidation treatment is conducted.

11. The method for producing the aggregate of carbon nanotubes of claim 10, wherein said oxidation treatment is to conduct burning treatment in a range of the combustion peak temperature of aggregate of carbon nanotubes±50° C.

12. The method for producing the aggregate of carbon nanotubes of claim 10, wherein said oxidation treatment is to conduct burning treatment under atmosphere in a range of the combustion peak temperature of aggregate of carbon nanotubes±15° C.

13. The method for producing the aggregate of carbon nanotubes of claim 10, wherein said oxidation treatment is to contact with oxygen intermittently.

14. The method for producing the aggregate of carbon nanotubes of claim 10, wherein said oxidation treatment is to treat the aggregate of carbon nanotubes produced with hydrogen peroxide.

15. The method for producing the aggregate of carbon nanotubes of claim 10, wherein said oxidation treatment is to treat the aggregate of carbon nanotubes produced with a mixed acid.

16. The method for producing the aggregate of carbon nanotubes of claim 15, further treating with a basic compound after treating with a mixed acid.

17. The method for producing the aggregate of carbon nanotubes of claim 16, wherein said basic compound is an organic amine.

18. A field emission material using the aggregate of carbon nanotubes of claim 1.

* * * * *